US008169644B2

(12) United States Patent
Katsuno et al.

(10) Patent No.: US 8,169,644 B2
(45) Date of Patent: May 1, 2012

(54) THERMAL DYE SUBLIMATION PRINTER AND INK RIBBON CASSETTE THEREFOR

(75) Inventors: Hiroshi Katsuno, Osaka (JP); Takashi Bunya, Kanagawa (JP); Shinsuke Kanayama, Kanagawa (JP); Shuichi Ota, Saitama (JP); Izumi Kariya, Kanagawa (JP); Sunao Kushiro, Osaka (JP); Kazuyoshi Murata, Kanagawa (JP); Hideki Yoneoka, Kanagawa (JP); Koichi Numata, Tokyo (JP)

(73) Assignee: Sony Corporation, Tokyo (JP)

( * ) Notice: Subject to any disclaimer, the term of this patent is extended or adjusted under 35 U.S.C. 154(b) by 907 days.

(21) Appl. No.: 11/976,112

(22) Filed: Oct. 22, 2007

(65) Prior Publication Data

US 2008/0278747 A1 Nov. 13, 2008

(30) Foreign Application Priority Data

Nov. 1, 2006 (JP) ................................. 2006-298159
Nov. 1, 2006 (JP) ................................. 2006-298161

(51) Int. Cl.
*G06F 3/12* (2006.01)

(52) U.S. Cl. ....................................... 358/1.15; 347/214

(58) Field of Classification Search ................. 358/1.15; 347/214

See application file for complete search history.

(56) References Cited

U.S. PATENT DOCUMENTS

2007/0058023 A1* 3/2007 Yoo ............................... 347/104

FOREIGN PATENT DOCUMENTS

| | | | |
|---|---|---|---|
| JP | 59-207276 | | 11/1984 |
| JP | 63-082775 | | 4/1988 |
| JP | 09-123499 | | 5/1997 |
| JP | 11-058901 | | 3/1999 |
| JP | 2000-233510 | | 8/2000 |
| JP | 2001-105703 | | 4/2001 |
| JP | 2001-117743 | | 4/2001 |
| JP | 2002-111943 | * | 4/2002 |
| JP | 2002-160387 | | 6/2002 |
| JP | 2003-182194 | | 7/2003 |
| JP | 2004-330556 | * | 11/2004 |
| JP | 2005-219406 | | 8/2005 |
| JP | 2005-271547 | | 10/2005 |
| JP | 2005-305656 | | 11/2005 |
| JP | 2005-328375 | | 11/2005 |
| JP | 2008-114424 | | 5/2008 |

OTHER PUBLICATIONS

Japan patent application publication (2002-111943), Asai et al., machine translation.*

(Continued)

*Primary Examiner* — Benny Tieu
*Assistant Examiner* — Qian Yang
(74) *Attorney, Agent, or Firm* — Rader Fishman & Grauer, PLLC

(57) ABSTRACT

A thermal dye sublimation printer to which an ink ribbon cassette having a function of transmitting and receiving data via wireless communication with a printer main body is attached, is disclosed. The thermal dye sublimation printer includes: communication means that transmits and receives data via wireless communication with an ink ribbon cassette; and control means that acquires management information of the ink ribbon cassette stored in the ink ribbon cassette side via the communication means and controls printing processing based on the acquired management information.

10 Claims, 19 Drawing Sheets

OTHER PUBLICATIONS

Japanese Office Action issued Dec. 16, 2008 for corresponding Japanese Application No. 2006-298159.

Japanese Office Action issued Dec. 16, 2008 for corresponding Japanese Application No. 2006-298161.

Japanese Office Action dated May 28, 2008 for corresponding Japanese Application No. 2006-298161.

Japanese Office Action dated May 27, 2008 for corresponding Japanese Application No. 2006-298159.

* cited by examiner

THERMAL DYE SUBLIMATION PRINTER AND INK RIBBON CASSETTE THEREFOR

CROSS REFERENCES TO RELATED APPLICATIONS

The present invention contains subject matter related to Japanese Patent Applications JP 2006-298159 and JP 2006-298161 both filed in the Japanese Patent Office on Nov. 1, 2006, the entire contents of which being incorporated herein by reference.

BACKGROUND OF THE INVENTION

1. Field of the Invention

The present invention relates to a thermal dye sublimation printer having a function of transmitting and receiving data via wireless communication and an ink ribbon cassette therefor.

2. Background Art

In related art, as a printer for printing images and characters on printing media, a thermal dye sublimation printer that prints color images and characters by sublimating color materials forming ink layers provided on one side of an ink ribbon and thermally transferring the color materials onto printing paper is known. This type of printer includes a thermal head that thermally transfers the color materials of the ink ribbon onto printing paper and a platen provided in a position facing the thermal head for supporting the ink ribbon and the printing paper.

Such a printer brings the ink ribbon and the printing paper into contact with each other so that the ink ribbon is at the thermal head side and the printing paper is at the platen side and allows the ink ribbon and the printing paper to travel between the thermal head and the platen while pressing the ink ribbon and the printing paper against the thermal head with the platen. Meanwhile, the printer applies thermal energy to the ink layers from the rear side of the ink ribbon traveling between the thermal head and the platen, sublimates the color materials with the thermal energy, thermally transfers the color materials onto the printing paper, and thus, prints color images and characters.

The printer includes, in the printer main body, an attachment part to which an ink ribbon cartridge containing a pair of spools around which an ink ribbon is wound is attached. In the ink ribbon cartridge containing the ink ribbon, the unused part of the ink ribbon is wound around one spool and the used part of the ink ribbon is wound around the other spool. When the ink ribbon cartridge is attached to the printer and operated by a traveling mechanism provided in the printer main body, the ink ribbon is drawn from the one spool, subjected to the thermal transfer process by the thermal head, and then, taken up by the other spool (see JP-A-6-340136 (patent document 1), for example).

Further, in a thermal dye sublimation printer that prints images and characters on printing media, it is necessary to set printing specifications for designating the number of printing sheets, printing size (including not only paper size but also image size by scaling), etc., and it is also necessary to manage so-called consumable items such as paper and ink ribbons because the printer often runs out of the paper or ink ribbon during the printing operation of some sheets (see JP-A-2001-18497 (patent document 2), JP-A-2002-52738 (patent document 3), JP-A-2004-284206 (patent document 4), JP-A-2005-140896 (patent document 5), for example).

SUMMARY OF THE INVENTION

However, ink ribbons vary among lots due to production tolerance. Accordingly, actual final printing results differ in colors and density depending on ink ribbons. Especially, when the color-related design is made, not an ink ribbon at the design center is prepared as the reference ink ribbon, and thus, the image quality in the market may significantly depart from the design value.

Further, in the manufacture of the printer main body, the density is read from the printing result and adjusted when the head voltage is adjusted. It is necessary for an operator to change the adjustment value depending on the ink ribbon in use from time to time, and therefore, sometimes process defects may be caused.

Accordingly, there is a need for a thermal dye sublimation printer and its ink ribbon cassette by which color variations in final printing results depending on ink ribbons can be eliminated and stable printing results can be constantly obtained, and it is not necessary to change the adjustment values depending on ink ribbons in manufacture.

Further, in a thermal dye sublimation printer using an ink ribbon, the quality of printing result is deteriorated due to change in color developing characteristic of the ink ribbon with time. That is, there have been problems that the density becomes lower, the color becomes lighter, and the colors at different degrees of deterioration with the disrupted gray balance may not reproduce grays.

Accordingly, there is a need for a thermal dye sublimation printer and its ink ribbon cassette by which beautiful printing results can be obtained for all time.

Specific advantages according to embodiments of the invention will be made clearer from the embodiments described as below.

An embodiment of the invention provides a thermal dye sublimation printer to which an ink ribbon cassette having a function of transmitting and receiving data via wireless communication with the printer main body is attached, and the thermal dye sublimation printer includes: communication means that transmits and receives data via wireless communication with an ink ribbon cassette; and control means that acquires management information of the ink ribbon cassette stored in the ink ribbon cassette side via the communication means and controls printing processing based on the acquired management information.

Further, another embodiment of the invention provides an ink ribbon cassette to be attached to a thermal dye sublimation printer having a function of transmitting and receiving data via wireless communication, and the ink ribbon cassette includes: communication means that transmits and receives data between a printer main body and itself; and storage means that stores management information of the ink ribbon cassette, wherein the management information stored in the storage means is transmitted to the printer main body via the communication means and the management information in the storage means is updated by the printer main body via the communication means.

According to the embodiments of the invention, since the management information of the ink ribbon cassette stored in the ink ribbon cassette side is acquired and the printing processing is controlled based on the acquired management information, the ink ribbon cassette is properly attached to the printer main body and the recognized by the printer main body via wireless communication. The printer main body controls the printing processing based on the management information to perform correction to proper colors, for example, and thereby, color variations in final printing results due to ink ribbons can be eliminated and stable printing results can be constantly obtained. Further, it is no longer necessary to change adjustment values depending on ink ribbons in manufacture with any resulting process defects.

Further, according to the embodiments of the invention, the print history information (the number of printed sheets, print size, or the like) recorded at the ink ribbon side as the management information is read by the printer main body using wireless communication, and thereby, the status of use of the ink ribbon can be confirmed and the surplus ink printing surface and the unused and taken up ink printing surface can be reused for more economic printing on the basis of the print history information. Furthermore, the same ink ribbon can be used for the print paper in different sizes, and therefore, the versatility is improved and the inconvenience that the ink ribbons are changed according to the sizes of the print paper no longer exists.

DESCRIPTION OF PREFERRED INVENTION

As below, embodiments of the present invention will be described in detail with reference to the drawings. It will be obvious that the invention is not limited to the following examples, but arbitrary changes may be made without departing from the scope of the invention.

Figure 1:
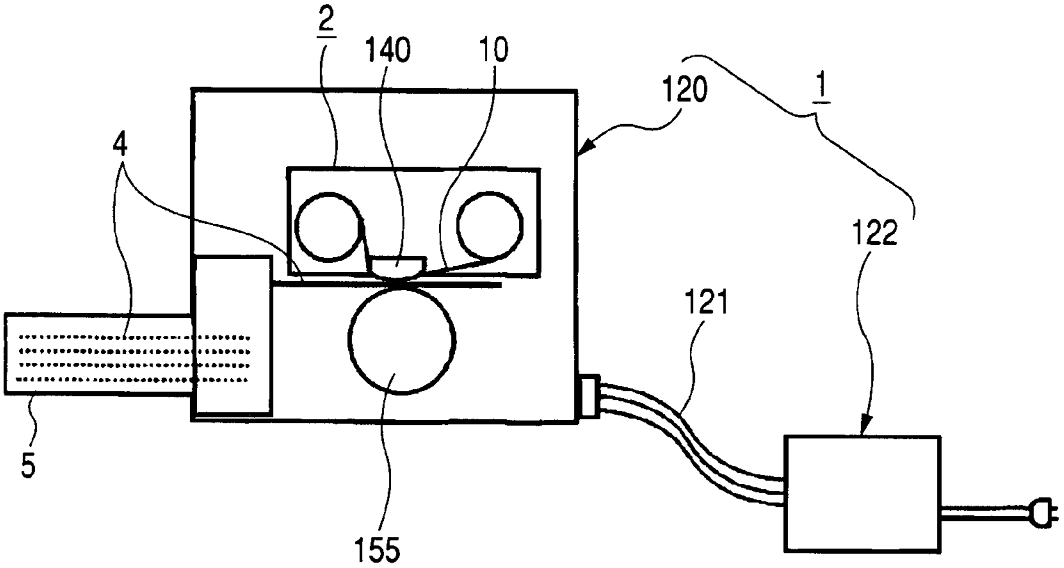
FIG. 1 schematically shows an overall configuration of a thermal dye sublimation printer to which an embodiment of the invention is applied.

The invention is applied to a thermal dye sublimation printer 1 having a configuration as shown in FIG. 1, for example.

As shown in FIG. 1, an ink ribbon cassette 2 containing an ink ribbon 10 is attached to the printer 1. The printer 1 allows the ink ribbon 10 and the printing paper 4 to travel between a thermal head 140 on which plural heating resistances are formed and a platen roller 155 provided in a position facing the thermal head 140, and prints images on printing paper 4 by applying thermal energy to the ink ribbon 10 with the thermal head 140 for thermally transferring the dye of the ink ribbon 10. The printer includes a printer main body 120 having a nearly rectangular shape to which a printing paper tray 5 containing printing paper 4 is attached as well as the ink ribbon cassette 2 is attached for transporting the printing paper 4 inside and outside for printing, and an external power supply 122 externally connected to the printer main body 120 via a power supply cable 121.

Figure 2:
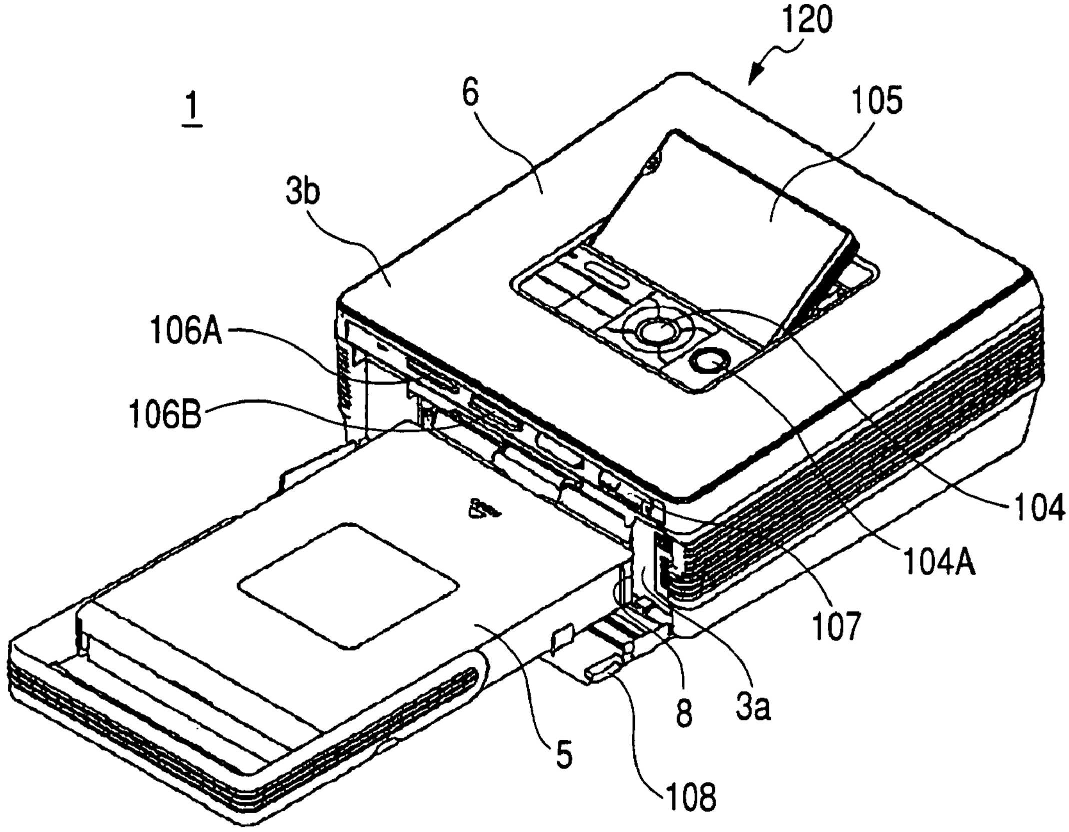
FIG. 2 is an appearance perspective view showing a condition in which a top board of the printer is closed.

In the printer 1, as shown in FIG. 2, an opening 8 through which the printing paper tray 5 containing the printing paper 4 is attached is formed on the front surface 3*a* of the printer main body 120, and the printing paper 4 is inserted into or ejected from the printer main body from the front surface 3*a* side.

The printer main body 120 is provided with the opening 8 through which the printing paper tray 5 containing the printing paper 4 is attached, recording media slots 106A, 106B through which various kinds of recording media are attached, and an open button 107 that pivotally and upwardly moves a top board 6 on the front surface 3*a*. The opening 8 is provided openably and closably with a shutter 108, and the printing paper tray 5 is attached when the shutter 108 is opened.

Figure 3:
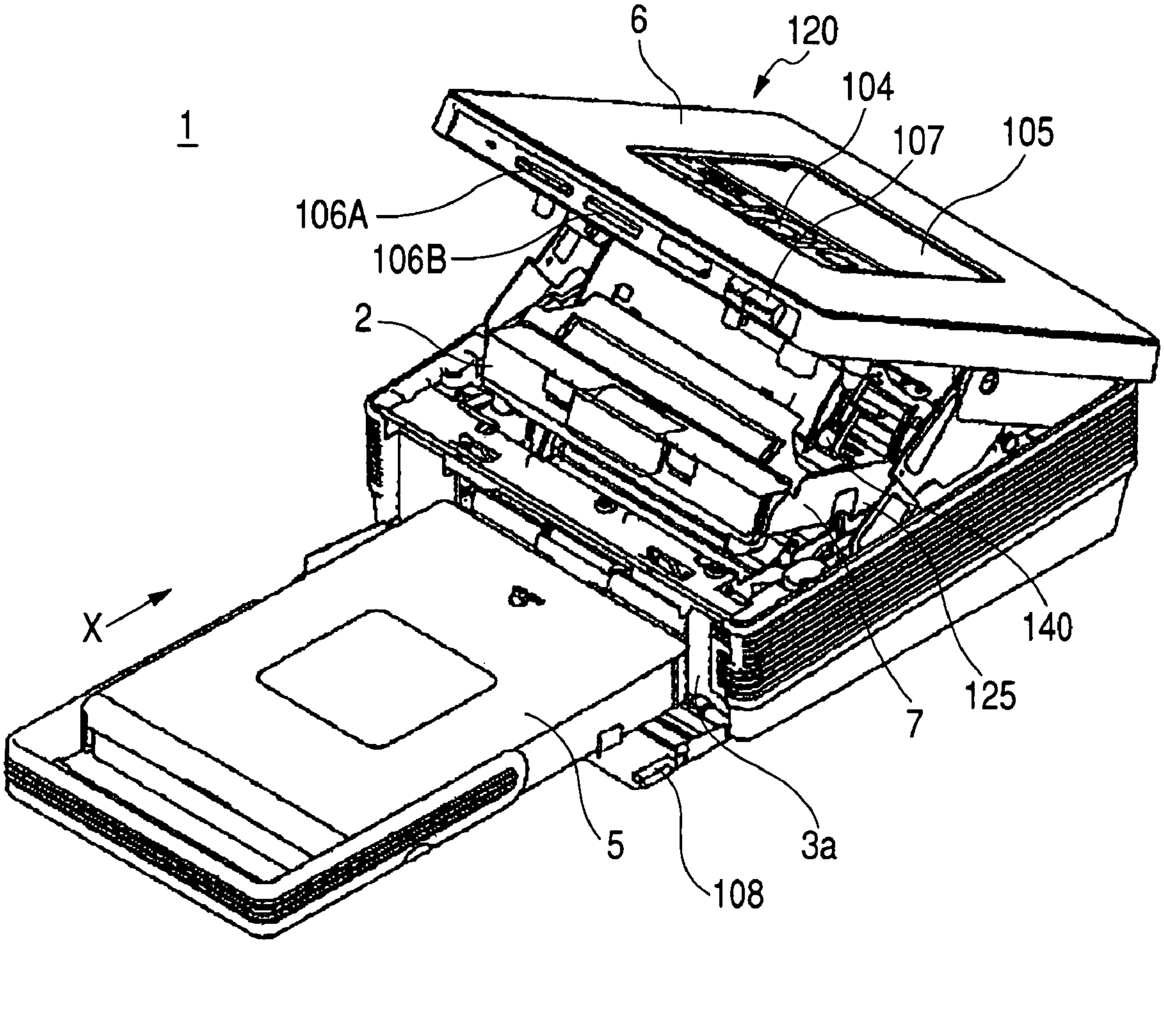
FIG. 3 is an appearance perspective view showing a condition in which the top board of the printer is opened.

Further, as shown in FIG. 3, the printer 1 has the top board 6 provided pivotally movable in the vertical direction as an upper surface 3*b* of the printer main body 120. When the top board 6 is pivotally and upwardly moved, an ink ribbon cassette holder 7 pivotally and upwardly moved together with the top board 6 is exposed outside of the front surface 3*a*, and the ink ribbon cassette 2 is inserted into and detached from the front surface 3*a* side.

The printer main body 120 is provided with an operation panel 104 of the printer 1 and an LCD panel 105 that displays printed images or the like on the top board 6 as the upper surface 3*b*. The top board 6 has a top chassis mounted thereon and is pivotally movable in the vertical direction together with the ink ribbon cassette holder 7 connected to the top chassis.

The printing paper tray 5 is attached through the opening 8, the ink ribbon cassette 2 is attached to the ink ribbon cassette holder 7 exposed to the front surface 3*a* when the open button 107 is operated and the top board 6 is pivotally and upwardly moved, the top board 6 is placed back to the printer main body 120 side, and thus, the printer 1 is ready for printing. Further, in the printer 1, images recorded in recording media and images recorded in various recording devices such as memory devices and digital still cameras connected via USB or the like are displayed on the LCD panel 105, and various operations such as selection of printed images, settings of sizes and the number of sheets, starting and stopping printing can be performed by operating the operation panel 104.

Image information recorded in various recording media such as recording media inserted into the recording media slots 106A, 106B provided in the printer main body 120 and digital still cameras connected via USB or the like are transmitted to the printer 1. Then, the printer applies thermal energy to the ink ribbon with the thermal head based on the image information, transports the printing paper 4 contained in the printing paper tray 5, and thereby, prints predetermined images.

Since the printer 1 is formed so that the printing paper 4 may be inserted into or ejected from the front surface 3*a* side and the ink ribbon cassette 2 can be inserted into and detached from the front surface 3*a* side, in comparison to a printer of the type that the ink ribbon cassette is inserted into and detached from the side surface of the printer main body, space for insertion and detachment of the ink ribbon cassette 2 is not necessary to be secured on the surface of the printer main body, which results in space savings for location of the printer 1 and improvement in usability. Further, insertion and detachment operations are easier for a user because he or she inserts and detaches the ink ribbon cassette 2 into and from the ink ribbon cassette holder 7 opened to the front surface 3*a* of the printer main body 120 while facing the front surface of the printer main body 120. Furthermore, in comparison to the type that the ink ribbon cassette is inserted into and detached from the side surface of the printer main body, in the printer 1, the transport mechanism of the printing paper 4, the traveling mechanism of the ink ribbon 10, etc. can be provided at the side surface of the printer main body 120, and the thermal head 140 and the ink ribbon 10 are made facing each other at the same time when the ink ribbon cassette 2 is attached.

Figure 4:
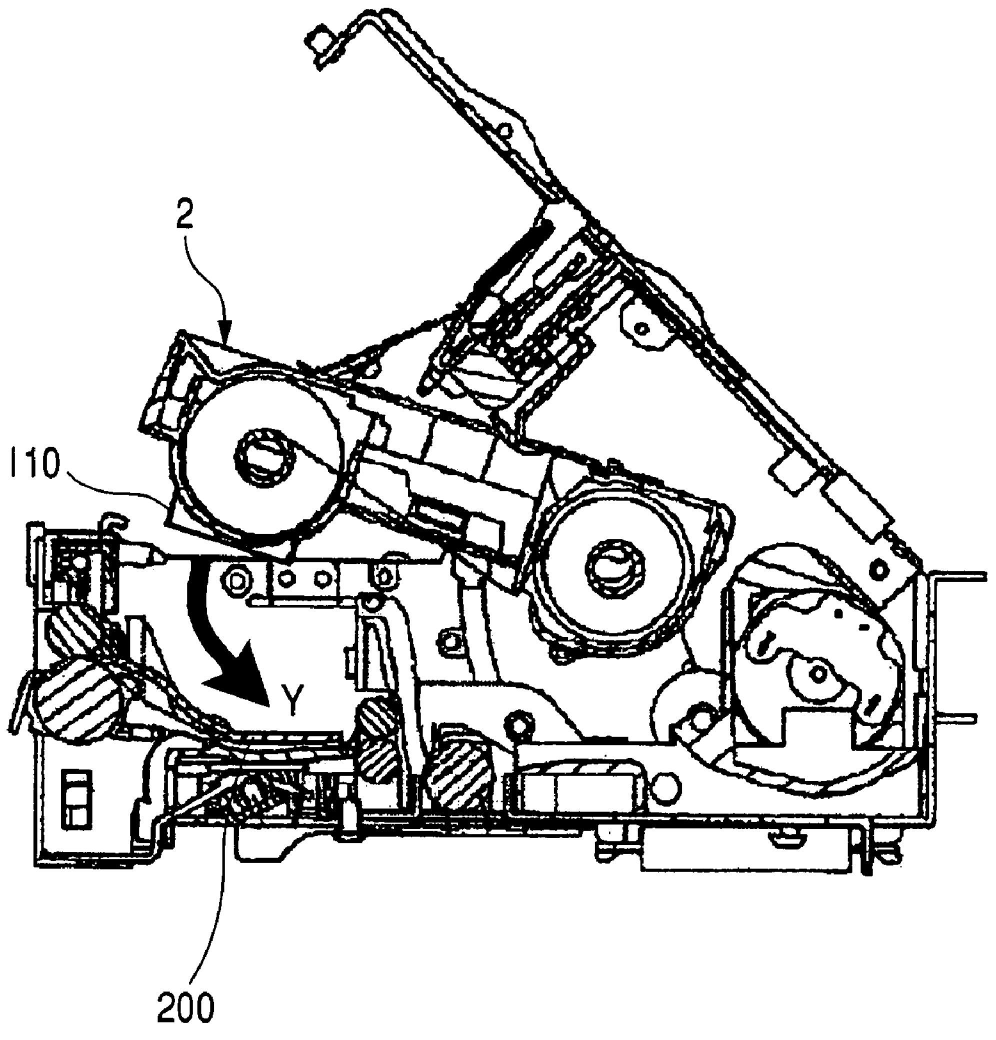
FIG. 4 is a sectional view of a main part showing a positional relationship between a wireless communication unit provided at the ink ribbon cassette side attached to the printer and a wireless communication unit provided at the printer main body side.

The printer 1 has a function of transmitting and receiving data via wireless communication with the ink ribbon cassette 2. As shown in FIG. 4, wireless communication units 110, 200 for management information are provided in both of the ink ribbon cassette 2 and the printer main body 120.

Figure 5:
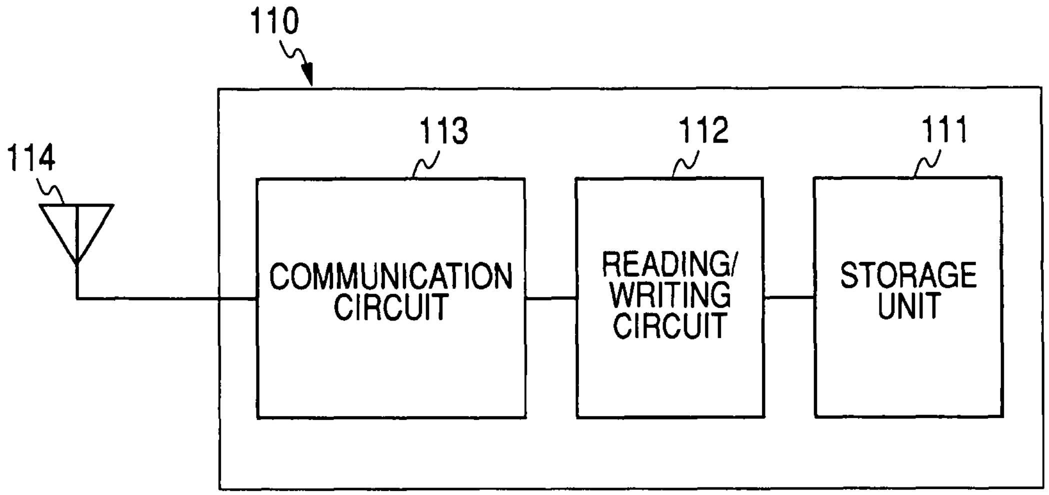
FIG. 5 is a block diagram showing a configuration of the wireless communication unit at the ink ribbon cassette side.

As shown in FIG. 5, the wireless communication unit 110 at the ink ribbon cassette 2 side includes a storage device 111 that stores management information of the ink ribbon cassette 2, a writing/reading circuit 112 that accesses the storage device 111 and writes and reads the management information, and a communication circuit 113 connected to the writing/reading circuit 112. The communication circuit 113 transmits and receives data between the printer main body 120 and itself via an antenna 114.

The wireless communication unit 110 at the ink ribbon cassette 2 side is a so-called IC tag, a device forming them is directly embedded in a tag-like or ink ribbon component and attached to the ink ribbon cassette 2.

Figure 6A:
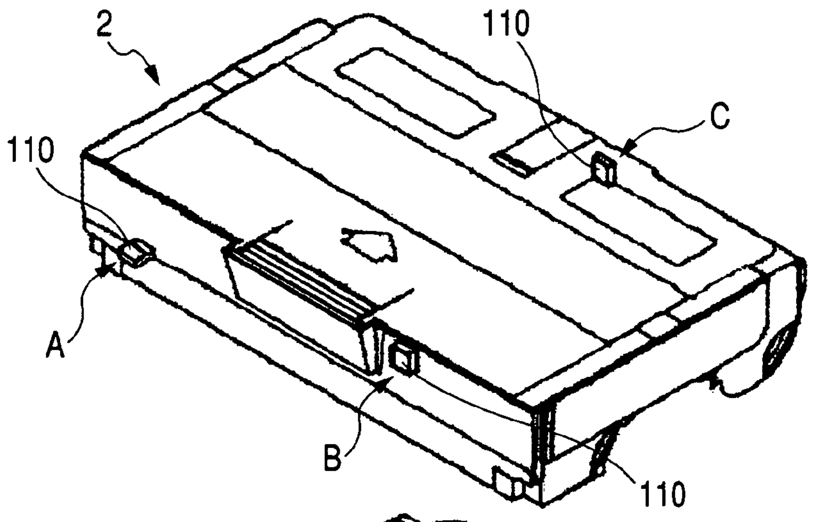
FIGS. 6A and 6B schematically show a position where the wireless communication unit at the ink ribbon cassette side is attached.
Figure 6B:
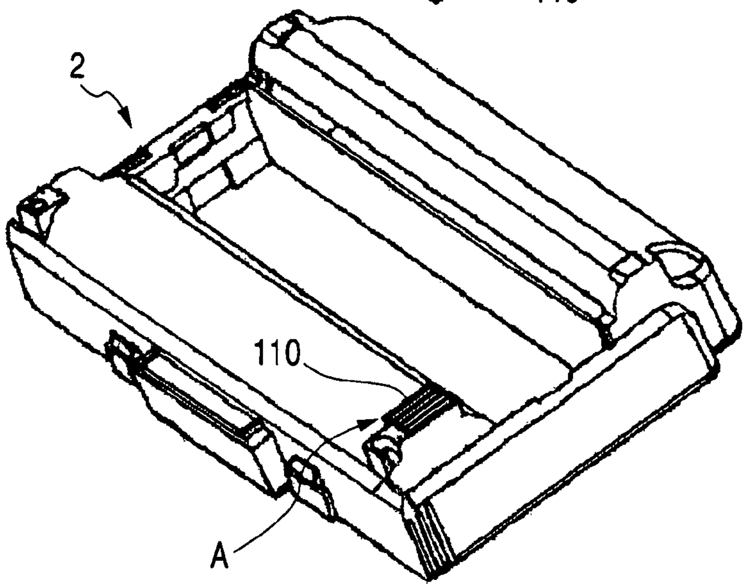

As shown in FIGS. 6A and 6B, the wireless communication unit 110 is attachable to three positions A, B, C of the ink ribbon cassette 2, for example. In the embodiment, the unit is attached to the position A.

Figure 7:
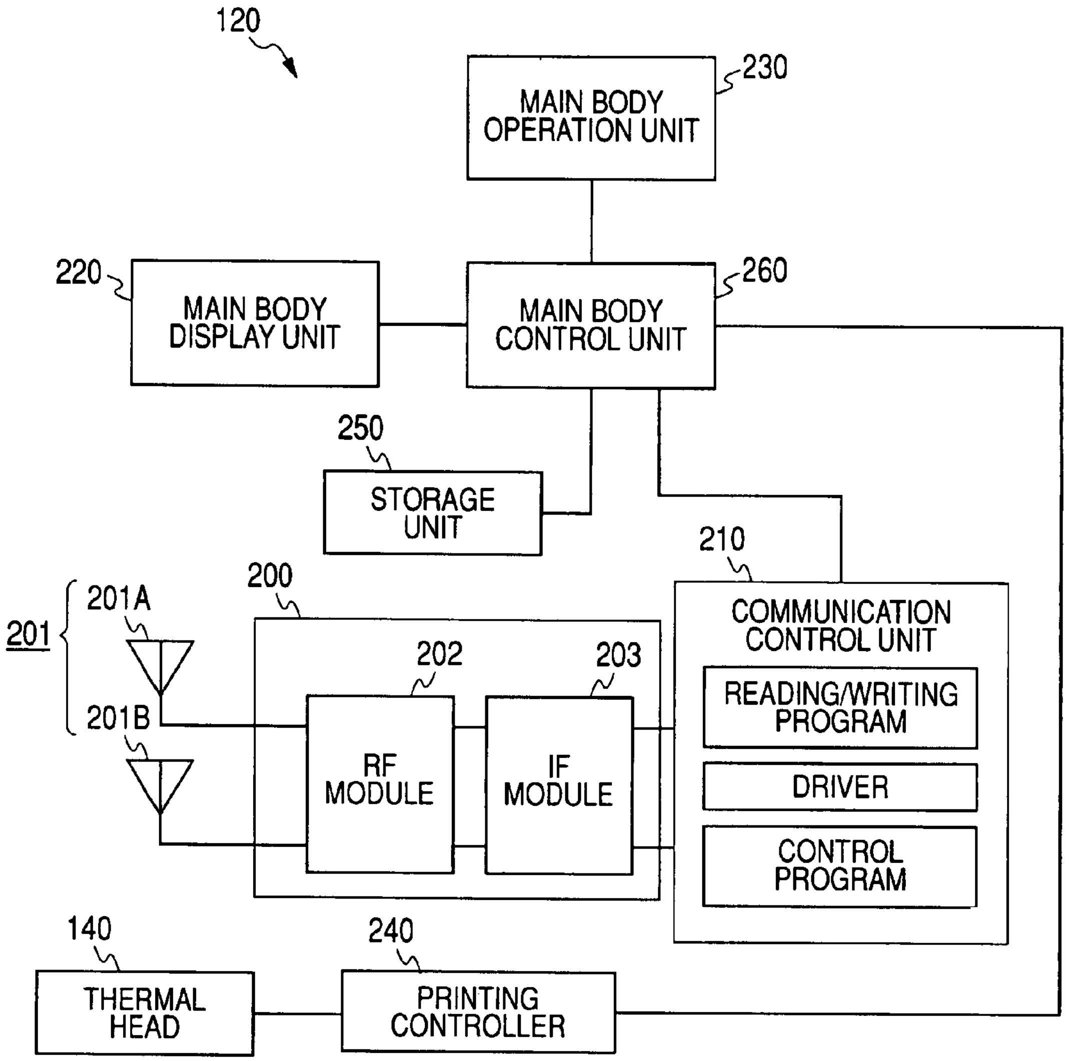
FIG. 7 is a block diagram showing a main part configuration of the printer.

Further, at the printer main body 120 side, as shown in FIG. 7, the wireless communication unit 200, a communication control unit 210 to which the wireless communication unit 200 is connected, a main body display unit 220 including the above mentioned LCD panel 105 etc., a main body operation unit 230 including the above mentioned operation panel 104 etc., a printing controller 240 that controls the thermal head 140, a storage device 250 for storing management information, and a main body control unit 260 to which the units are connected are provided.

The wireless communication unit 200 at the printer main body 120 side includes a radio frequency (RF) module 202 that transmits and receives data between the ink ribbon cassette 2 and itself via an antenna 201, and an intermediate frequency (IF) module 203 connected to the RF module 202.

In the printer 1, two antennas 201A, 201B are provided on the wireless communication unit 200 at the printer main body 120 side, and the wireless communication for data with the ink ribbon cassette 2 attached to the printer main body 120 is performed with the antenna 201A and the wireless communication for data with the ink ribbon cassette 2 made close to the printer main body 120 is performed with the antenna 201B.

In the printer 1, when the ink ribbon cassette 2 is attached to the above described ink ribbon cassette holder 7 and the top board 6 is placed back to the printer main body 120 side, the ink ribbon cassette 2 moves in the direction of arrow Y, the wireless communication unit 110 at the ink ribbon cassette 2 side and the wireless communication unit 200 at the printer main body 120 side come closer, and then, both wireless communication units 110, 200 make wireless interactive communication.

The communication control unit 210 at the printer main body 120 side includes a reading/writing control program, a communication control driver, a control program, etc. When the antenna 114 of the wireless communication unit 110 at the ink ribbon cassette 2 side and the antenna 201A of the wireless communication unit 200 at the printer main body 120 side come close at a certain distance, the ink ribbon cassette 2 and the printer main body 120 can communicate with each other. By the communication control unit 210 at the printer main body 120 side, in accordance with the reading/writing control program, the management information stored in the wireless communication unit 110 at the ink ribbon cassette 2 side is stored in the storage device 250 at the printer main body 120 side via the wireless communication unit 200 at the printer main body 120 side, or oppositely, the management information stored in the storage device 250 at the printer main body 120 is stored in the storage device 111 of the wireless communication unit 110 at the ink ribbon cassette 2 side.

In the printer 1, the main body control unit 260 at the printer main body 120 side acquires types of the ink ribbon, for example, sizes such as P-size and L-size as management information of the above described ink ribbon cassette 2 to select a printing condition, printing sequence suitable for the ink ribbon, and reads the information again when printing is started to confirm that the ink ribbon cassette 2 is attached.

Further, when the antenna 114 of the wireless communication unit 110 at the ink ribbon cassette 2 side comes close to the antenna 201B of the wireless communication unit 200 at the printer main body 120 side at a certain distance outside of the printer main body 120, the ink ribbon cassette 2 and the printer main body 120 can communicate with each other. By the communication control unit 210 at the printer main body 120 side, according to the reading/writing program, the management information stored in the wireless communication unit 110 at the ink ribbon cassette 2 side is stored in the storage device 250 at the printer main body 120 side via the wireless communication unit 200 at the printer main body 120 side, or oppositely, the management information stored in the storage device 250 at the printer main body 120 is stored in the storage device 111 of the wireless communication unit 110 at the ink ribbon cassette 2 side.

Here, as management information of the above described ink ribbon cassette 2, for example, there are printable number of sheets information, print history information, date of manufacture information, unique color information of the ink ribbon therein, etc of the ink ribbon cassette 2.

In the printer 1, the main body control unit 260 at the printer main body 120 side acquires management information of the ink ribbon cassette 2 stored in the ink ribbon cassette 2 via the wireless communication unit 200 and the communication control unit 210, and controls printing processing based on the acquired management information in the following manner.

Figure 8:
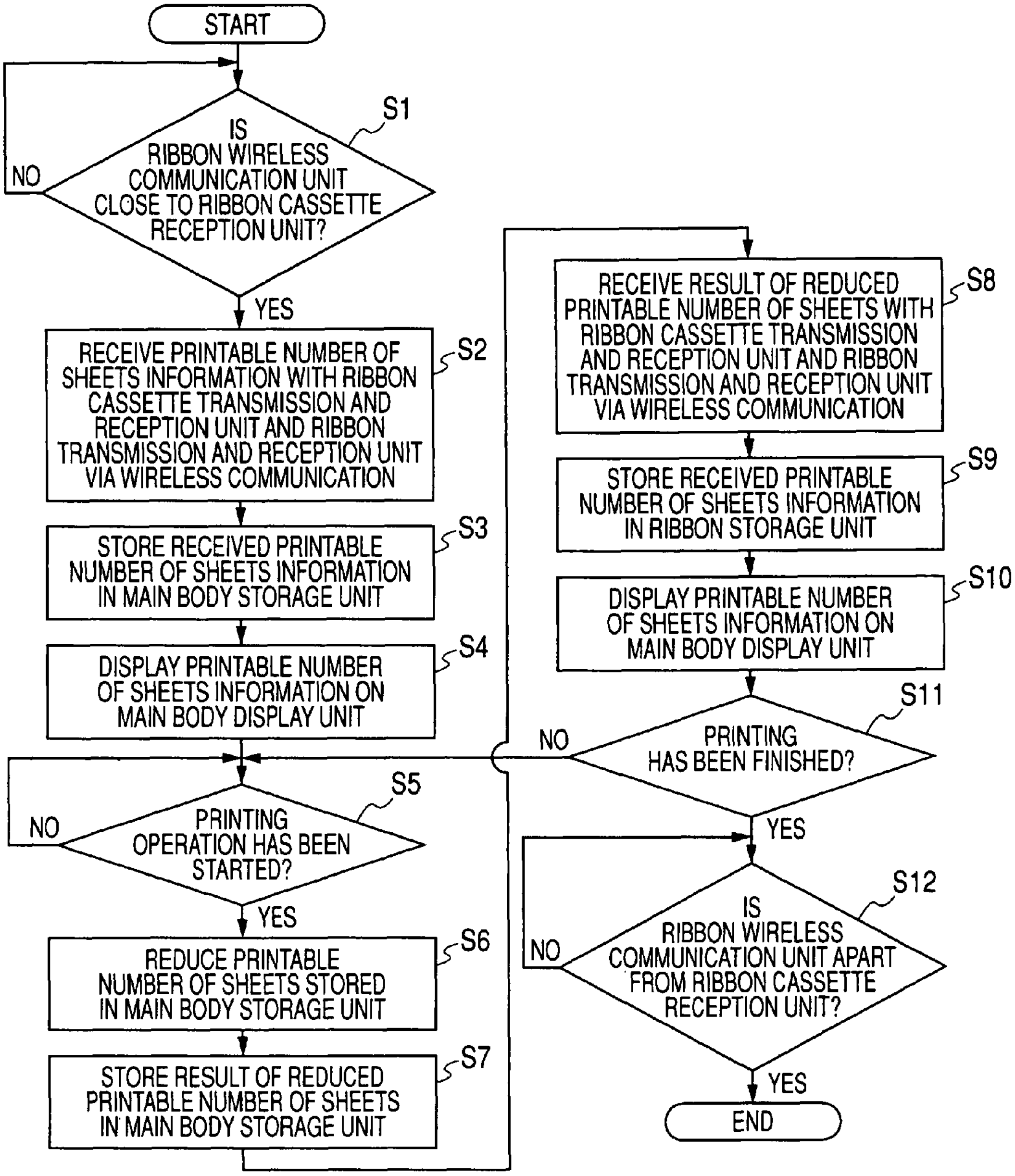
FIG. 8 is a flowchart showing a control procedure of printing processing to be executed after the printable number of sheets information of the ink ribbon cassette is acquired by the main body control unit at the printer main body side.

The main body control unit 260 at the printer main body 120 side can acquire printable number of sheets information of the ink ribbon cassette 2 attached to the printer main body 120 according to the procedure shown in the flowchart of FIG. 8 as the management information, for example, and display the acquired printable number of sheets information on the main body display unit 220.

The main body control unit 260 at the printer main body 120 side judges whether the antenna 114 of the wireless communication unit 110 at the ink ribbon cassette 2 side is close to the antenna 201A of the wireless communication unit 200 at the printer main body 120 side (step S1). If the judgment result is YES, that is, the wireless communication unit 110 at the ink ribbon cassette 2 side is close to the wireless communication unit 200 at the printer main body 120 side, the control unit wirelessly communicates between the wireless communication unit 200 at the printer main body 120 side and the wireless communication unit 110 at the ink ribbon cassette 2 side and acquires printable number of sheets information of the ink ribbon cassette 2 (step S2), stores the acquired printable number of sheets information as printing information a in the storage device 250 at the printer main body 120 side (step S3), and displays the printable number of sheets information on the main body display unit 220 (step S4).

Then, the main body control unit 260 at the printer main body 120 side judges whether the printing operation has been started or not (step S5). If the judgment result is YES, that is, the printing operation is started, the control unit reduces the printable number of sheets information stored in the storage device 250 at the printer main body 120 side (step S6), and stores the reduced printable number of sheets information in the storage device 250 at the printer main body 120 side (step S7).

Next, the control unit wirelessly communicates between the wireless communication unit 200 at the printer main body 120 side and the wireless communication unit 110 at the ink ribbon cassette 2 side and transmits the reduced printable number of sheets information to the wireless communication unit 110 at the ink ribbon cassette 2 side, and the wireless communication unit 110 at the ink ribbon cassette 2 side receives the reduced printable number of sheets information (step S8) and stores the received printable number of sheets information in the storage device 111 at the ink ribbon cassette 2 side (step S9).

Then, the main body control unit 260 at the printer main body 120 side displays the printable number of sheets information on the main body display unit 220 (step S10) and judges whether the printing operation has been finished or not (step S11). If the judgment result is NO, that is, the printing operation has not been finished, the control unit returns to the above described step S5 and judges whether the next printing operation has been started or not. If the judgment result at step S10 is YES, that is, the printing operation has been finished, the control unit judges whether the wireless communication unit 110 at the ink ribbon cassette 2 side is apart from the wireless communication unit 200 at the printer main body 120 side or not (step S12), and if the judgment result is YES, that is, they are apart, the control unit ends the control operation.

The main body control unit 260 at the printer main body 120 side in the printer 1 acquires printable number of sheets information stored in the ink ribbon cassette 2 side and displays it on the main body display unit 220, and controls printing based on the acquired printable number of sheets information and updates the printable number of sheets information stored in the ink ribbon cassette 2 side.

Figure 9:
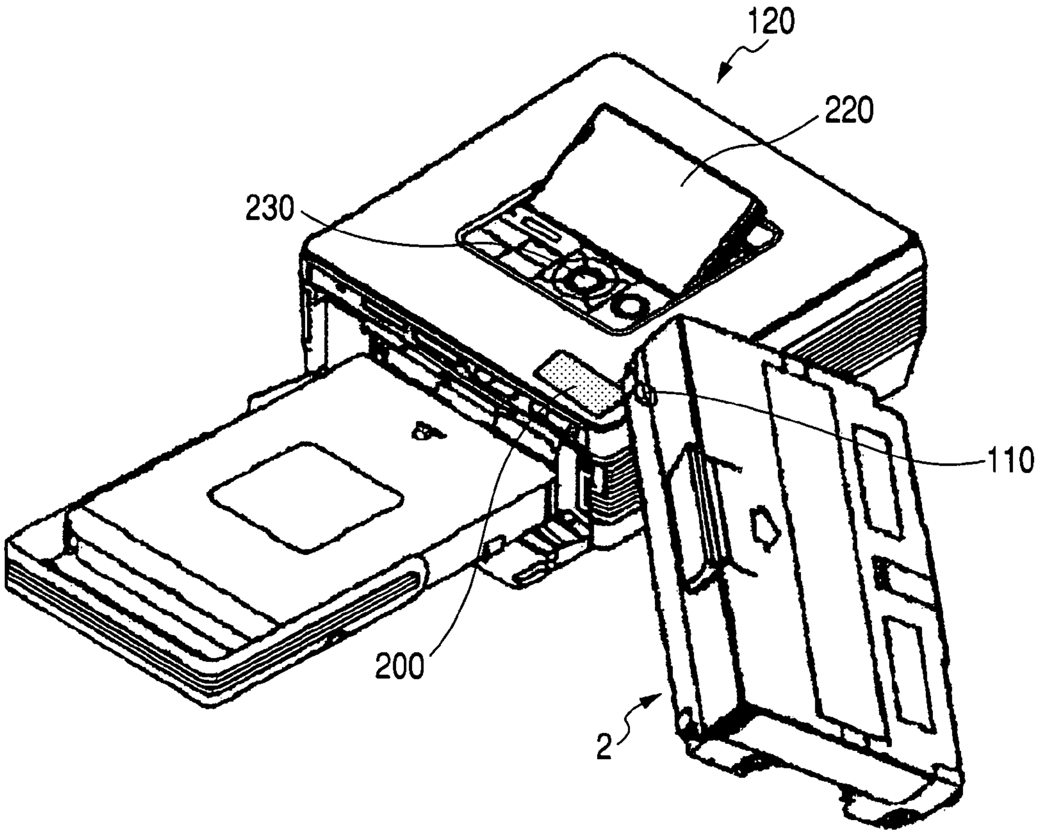
FIG. 9 is a perspective view showing a condition in which the ink ribbon cassette is made close to the printer.

Further, when the antenna 114 of the wireless communication unit 110 of the ink ribbon cassette 2 is made close to the antenna 201B of the wireless communication unit 200 of the printer main body 120, the ink ribbon cassette 2 and the printer main body 120 are able to wirelessly communicate with each other as shown in FIG. 9. By the interactive wireless communication, the main body control unit 260 at the printer main body 120 side in the printer 1 acquires the printable number of sheets information stored in the storage device 111 of the wireless communication unit 110 of the ink ribbon cassette 2, stores the acquired printable number of sheets information as printing information P in the storage device 250 at the printer main body 120 side, and displays the acquired printable number of sheets information on the main body display unit 220.

Figure 10:
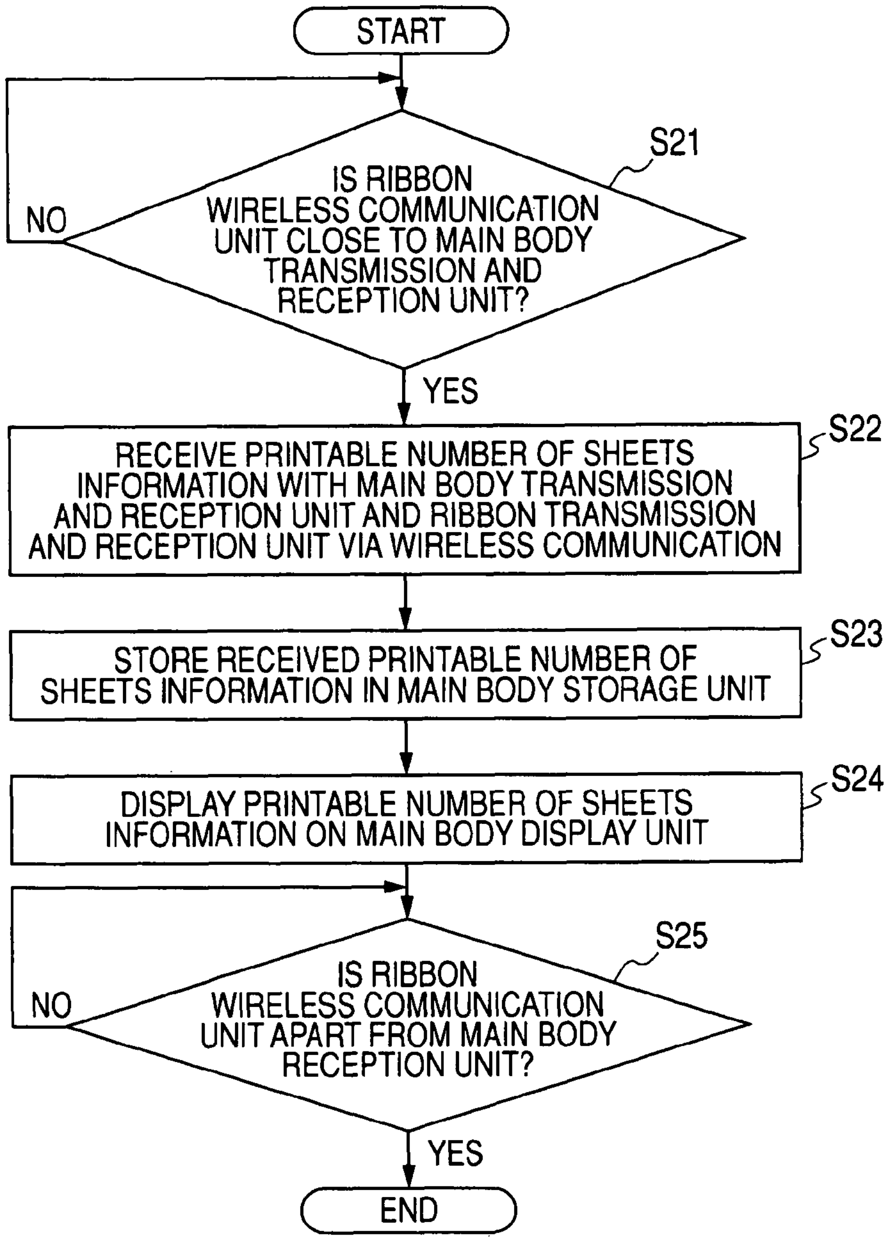
FIG. 10 is a flowchart showing a control procedure of processing of acquiring the printable number of sheets information of the ink ribbon cassette made close to the printer and displaying the information by the main body control unit at the printer main body side.

The control operation of displaying the printable number of sheets information of the ribbon cassette 2 obtained when the ribbon cassette 2 is made close to the printer main body 120 is performed according to the procedure shown in a flowchart of FIG. 10, for example.

The main body control unit 260 at the printer main body 120 side judges whether the antenna 114 of the wireless communication unit 110 at the ink ribbon cassette 2 side is close to the antenna 201B of the wireless communication unit 200 at the printer main body 120 side (step S21). If the judgment result is YES, that is, the antenna 114 of the wireless communication unit 110 at the ink ribbon cassette 2 side is close to the antenna 201B of the wireless communication unit 200 at the printer main body 120 side, the control unit wirelessly communicates between the wireless communication unit 200 at the printer main body 120 side and the wireless communication unit 110 at the ink ribbon cassette 2 side and acquires printable number of sheets information of the ink ribbon cassette 2 (step S22), stores the acquired printable number of sheets information as printing information D in the storage device 250 at the printer main body 120 side (step S23), and displays the printable number of sheets information of the ink ribbon cassette 2 (printing information A) on the main body display unit 220 (step S24).

Then, the main body control unit 260 at the printer main body 120 side judges whether the antenna 114 of the wireless communication unit 110 at the ink ribbon cassette 2 side is apart from the antenna 201B of the wireless communication unit 200 at the printer main body 120 side or not (step S25), and if the judgment result is YES, that is, they are apart, the control unit ends the control operation.

The main body control unit 260 at the printer main body 120 side in the printer 1 also acquires printable number of sheets information stored in the ink ribbon cassette 2 and displays it on the main body display unit 220 when the antenna 114 of the wireless communication unit 110 at the ink ribbon cassette 2 side is close to the antenna 201B of the wireless communication unit 200 at the printer main body 120 side at a certain distance.

Further, a user can switch at user's option between the printable number of sheets of the ribbon cassette 2 attached to the printer main body 120 and the printable number of sheets of the ribbon cassette 2 made close to the printer main body 120 on the main body display unit 220 for confirmation by performing predetermined operations with the main body operation unit 230 at the printer main body 120 side.

Furthermore, the operation of displaying the printable number of sheets of the ribbon cassette 2 immediately after attached to the printer main body 120 and after printing (of one or some sheets) and the operation of displaying the printable number of sheets of the ribbon cassette 2 obtained when the ribbon cassette 2 is made close to the printer main body 120 may be performed as parallel operations by the main body control unit, or necessary printable numbers of sheets may be simultaneously displayed or switched for display by the switching operation with the main body operation unit 230 at user's option.

Additionally, an indication for prompting the user to replace the ink ribbon may be displayed as a message on the main body display unit 220 by sensing the number of printed sheets.

Moreover, by the combination of the operation of displaying the printable number of sheets of the ribbon cassette 2 immediately after attached to the printer main body 120 and after printing (of one or some sheets) and the operation of displaying the printable number of sheets of the ribbon cassette 2 obtained when the ribbon cassette 2 is made close to the printer main body 120, when the number of remaining printable number sheets of the ink ribbon becomes smaller during printing, a message about the shortage may be displayed on the main body display unit 220, and, if the user holds another ink ribbon over the printer main body 120, the printable number of sheets is obtained and, when the number of sheets is short, an icon indicating the shortage may be displayed.

In the printer 1, as has been described, the two antennas 201A, 201B are provided on the wireless communication unit 200 at the printer main body 120 side, and the wireless communication of data with the ink ribbon cassette 2 attached to the printer main body 120 is performed with the antenna 201A and the wireless communication of data with the ink ribbon cassette 2 made close to the printer main body 120 is performed with the antenna 201B. However, one antenna may serve as the antenna 201A for the wireless communication of data with the ink ribbon cassette 2 attached to the printer main body 120 and the antenna 201B for the wireless communication of data with the ink ribbon cassette 2 made close to the printer main body 120.

Figure 11:
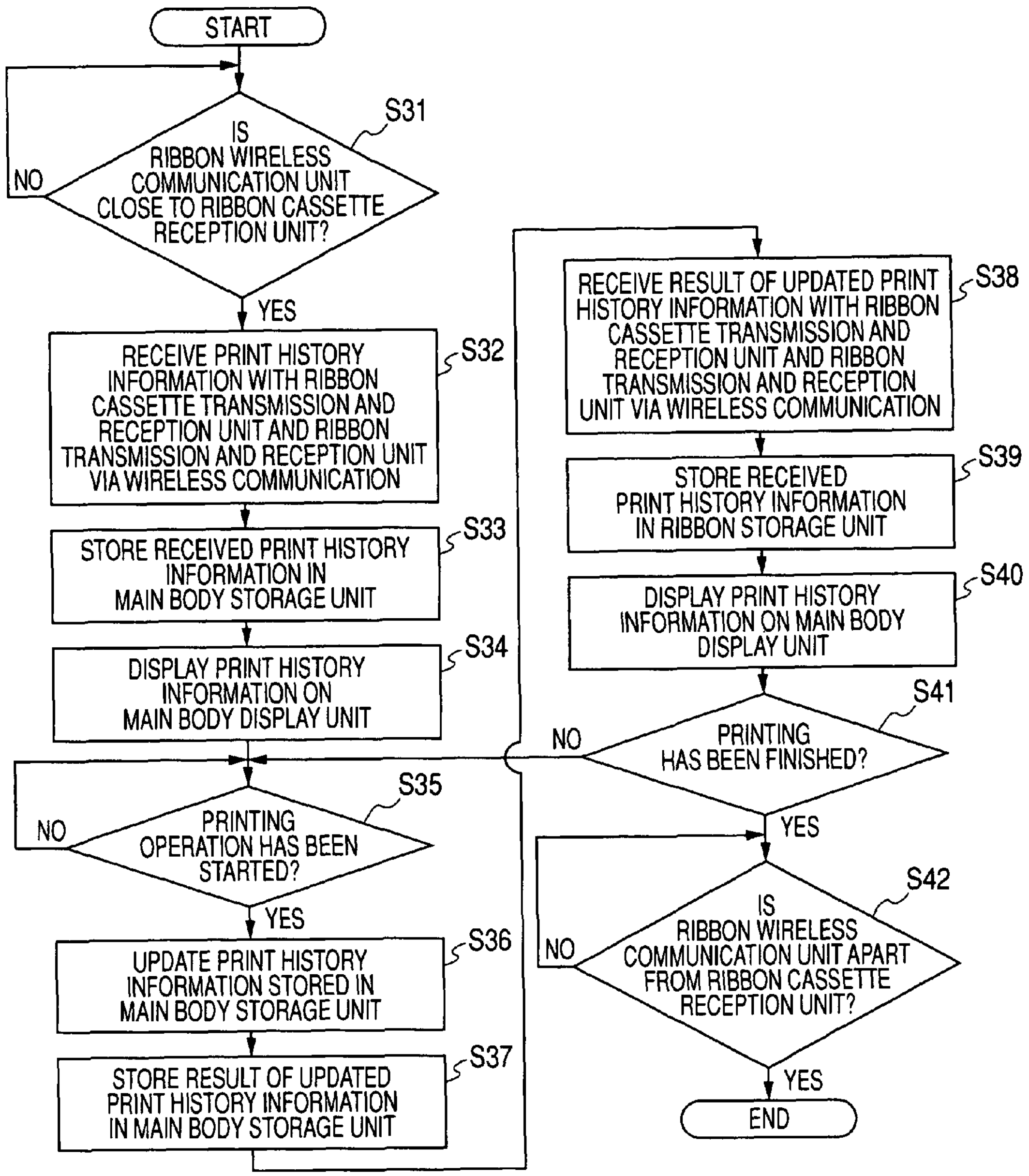
FIG. 11 is a flowchart showing a control procedure of printing processing to be executed after the print history information of the ink ribbon cassette is acquired by the main body control unit at the printer main body side.

Further, the main body control unit 260 at the printer main body 120 side can acquire print history information of the ink ribbon cassette 2 attached to the printer main body 120 according to the procedure shown in the flowchart of FIG. 11 as the management information, for example, and display the acquired print history information on the main body display unit 220.

The main body control unit 260 at the printer main body 120 side judges whether the wireless communication unit 110 at the ink ribbon cassette 2 side is close to the wireless communication unit 200 at the printer main body 120 side (step S31). If the judgment result is YES, that is, the wireless communication unit 110 at the ink ribbon cassette 2 side is close to the wireless communication unit 200 at the printer main body 120 side, the control unit wirelessly communicates between the wireless communication unit 200 at the printer main body 120 side and the wireless communication unit 110 at the ink ribbon cassette 2 side and acquires print history information of the ink ribbon cassette 2 (step S32), stores the acquired print history information in the storage device 250 at the printer main body 120 side (step S33), and displays the print history information on the main body display unit 220 (step S34).

Then, the main body control unit 260 at the printer main body 120 side judges whether the printing operation has been started or not (step S35). If the judgment result is YES, that is, the printing operation is started, and the control unit updates the print history information stored in the storage device 250 at the printer main body 120 side (step S36) and stores the updated print history information in the storage device 250 at the printer main body 120 side (step S37).

Next, the control unit wirelessly communicates between the wireless communication unit 200 at the printer main body 120 side and the wireless communication unit 110 at the ink ribbon cassette 2 side and transmits the updated print history information to the wireless communication unit 110 at the ink ribbon cassette 2 side, and the wireless communication unit 110 at the ink ribbon cassette 2 side receives the updated print history information (step S38) and stores the received print history information in the storage device 111 at the ink ribbon cassette 2 side (step S39).

Then, the main body control unit 260 at the printer main body 120 side displays the print history information on the main body display unit 220 (step S40) and judges whether the printing operation has been finished or not (step S41). If the judgment result is NO, that is, the printing operation has not been finished, the control unit returns to the above described step S35 and judges whether the next printing operation has been started or not. If the judgment result at step S41 is YES, that is, the printing operation has been finished, the control unit judges whether the wireless communication unit 110 at the ink ribbon cassette 2 side is apart from the wireless communication unit 200 at the printer main body 120 side or not (step S42), and if the judgment result is YES, that is, they are apart, the control unit ends the control operation.

As described above, in the printer 1, the print history information (the number of printed sheets, print size, or the like) recorded at the ink ribbon cassette 2 side as the management information is read by the printer main body 120 using wireless communication, and thereby, the status of use of the ink ribbon cassette 2 can be confirmed and the surplus ink printing surface and the unused and taken up ink printing surface can be reused for more economic printing based on the print history information. Further, the same ink ribbon can be used for the print paper in different sizes, and therefore, the versatility is improved and the inconvenience that the ink ribbons are changed according to the sizes of the print paper no longer exists.

The user can confirm the print history information of the ink ribbon cassette 2 attached to the printer main body 120 by performing predetermined operations with the main body operation unit 230.

Further, the main body control unit 260 at the printer main body 120 side acquires unique color information that the ink ribbon contained in the ink ribbon cassette 2 attached to the printer main body 120 has as the management information, for example, stores the information in the storage device 250 at the printer main body 120 side, controls the printing processing based on the color information, and thereby, can perform color correction corresponding to the unique color developing characteristic of the ink ribbon cassette 2 attached to the printer main body 120.

For example, the difference between the acquired color information and the color information of the reference medium (the ink ribbon as reference when color design is made) is calculated and the printing conditions of the respective colors are corrected, and thereby, the stable printing results can be constantly obtained without changes in colors depending on the ink ribbons. Further, since the printer main body already has the correction function at the time of manufacture, it is no longer necessary to change the adjustment values depending on the ink ribbons with any resulting process defects.

Figure 12:
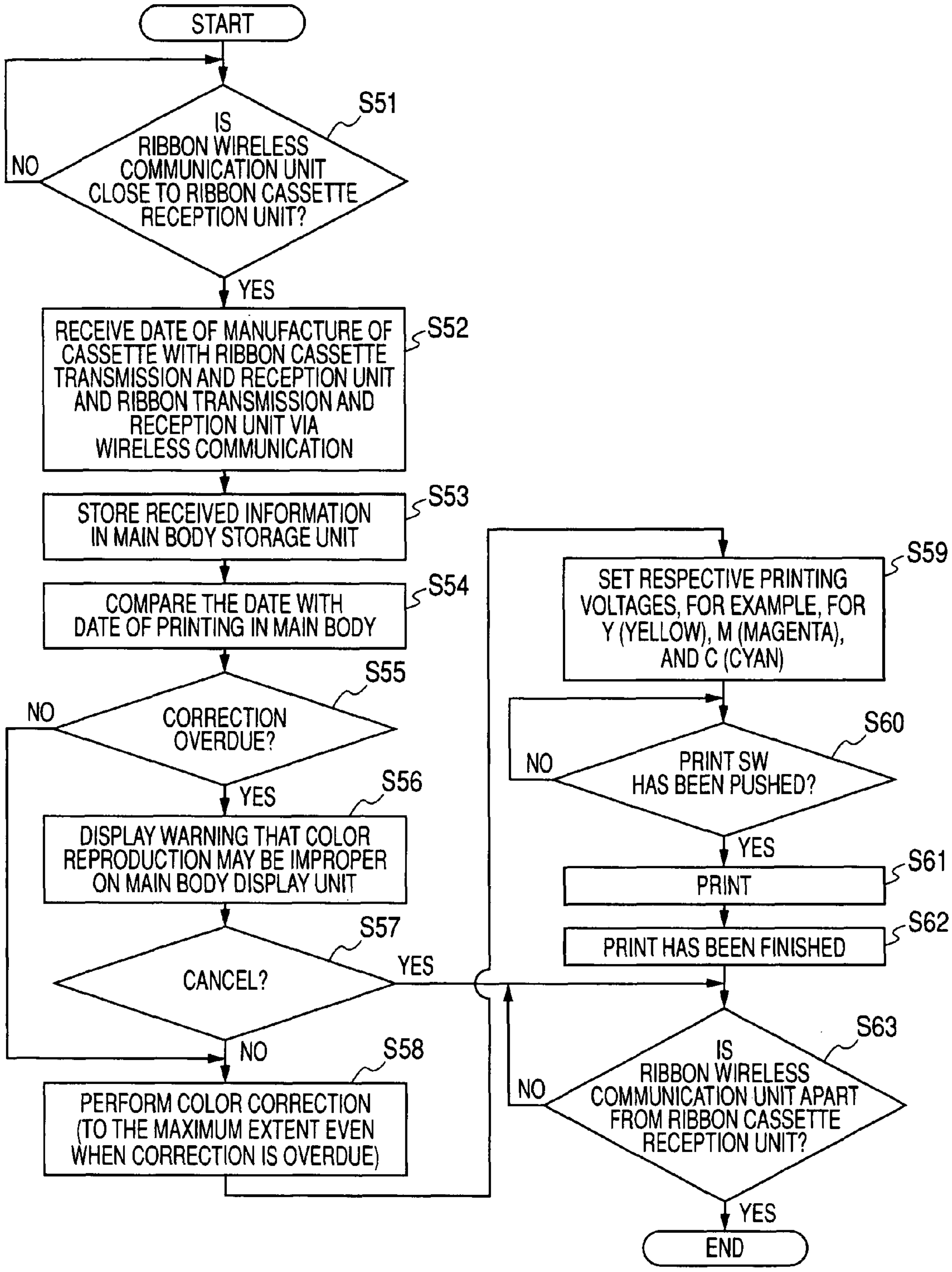
FIG. 12 is a flowchart showing a control procedure of printing processing to be executed after the date of manufacture information of the ink ribbon cassette is acquired by the main body control unit at the printer main body side.

Further, according to the procedure shown in the flowchart of FIG. 12, the main body control unit 260 at the printer main body 120 side acquires date of manufacture information of the ink ribbon cassette 2 attached to the printer main body 120 as the management information, for example, stores the information in the storage device 250 at the printer main body 120 side, controls the printing processing based on the date of manufacture information, and thereby, can perform color correction corresponding to the change in the color developing characteristic due to change of the ink ribbon with time contained in the ink ribbon cassette 2 contained in the printer main body 120. Further, the main body control unit 260 at the printer main body 120 side controls to warn of color deterioration in the printing result when the color correction to the ink ribbon cassette 2 attached to the printer main body 120 is insufficient, on the basis of the acquired date of manufacture information.

The main body control unit 260 at the printer main body 120 side judges whether the wireless communication unit 110 at the ink ribbon cassette 2 side is close to the wireless communication unit 200 at the printer main body 120 side (step S51). If the judgment result is YES, that is, the wireless communication unit 110 at the ink ribbon cassette 2 side is close to the wireless communication unit 200 at the printer main body 120 side, the control unit wirelessly communicates between the wireless communication unit 200 at the printer main body 120 side and the wireless communication unit 110 at the ink ribbon cassette 2 side and acquires date of manufacture information of the ink ribbon cassette 2 (step S52), and stores the acquired date of manufacture information in the storage device 250 at the printer main body 120 side (step S53).

Then, the main body control unit 260 at the printer main body 120 side compares the current date information with the acquired date of manufacture information (step S54), judges whether the color correction of the attached ink ribbon cassette 2 is overdue or not (step S55). If the judgment result is NO, that is, the color correction is not overdue, the unit performs the color correction corresponding to the change in color development characteristic due to change of the ink ribbon with time based on the date of manufacture information (step S56). Further, if the judgment result at step S55 is YES, that is, the color correction is overdue, the unit gives a warning that the color may be deteriorated in the printing result on the display (step S57), and judges whether the instruction for stopping printing by the operation of the main body operation unit 230 is received or not (step S58). If the judgment result is NO, that is, there is no instruction for stopping printing, the control unit returns to the above described step S56 and performs the color correction corresponding to the change in color development characteristic due to change of the ink ribbon with time based on the date of manufacture information to the maximum extent.

Next, the main body control unit 260 at the printer main body 120 side sets printing voltages of Y (yellow), M (magenta) c (cyan) in the printing controller 24 that controls the thermal head 140 (step S59).

Then, the main body control unit 260 at the printer main body 120 side in this condition judges whether the print button of the main body operation unit 230 is pushed or not (step S60). If the judgment result is YES, that is, the print button is pushed, the printing operation is started (step S61). When the printing operation is finished (step S62), the control unit judges whether the wireless communication unit 110 at the ink ribbon cassette 2 side is apart from the wireless communication unit 200 at the printer main body 120 side or not (step S63), and if the judgment result is YES, that is, they are apart, the control unit ends the control operation.

If the judgment result at the step S58 is YES, that is, the instruction for stopping printing by the operation of the main body operation unit 230 is received, the control unit immediately moves to the judgment processing at step S63 and judges whether the wireless communication unit 110 at the ink ribbon cassette 2 side is apart from the wireless communication unit 200 at the printer main body 120 side or not.

Here, the color density of the printing result by the printer 1 is controlled according to the energization time of the thermal head 140 by the printing controller 24. For example, the maximum density in the system that prints one line per one millisecond is set to 90% of one millisecond.

Figure 13:
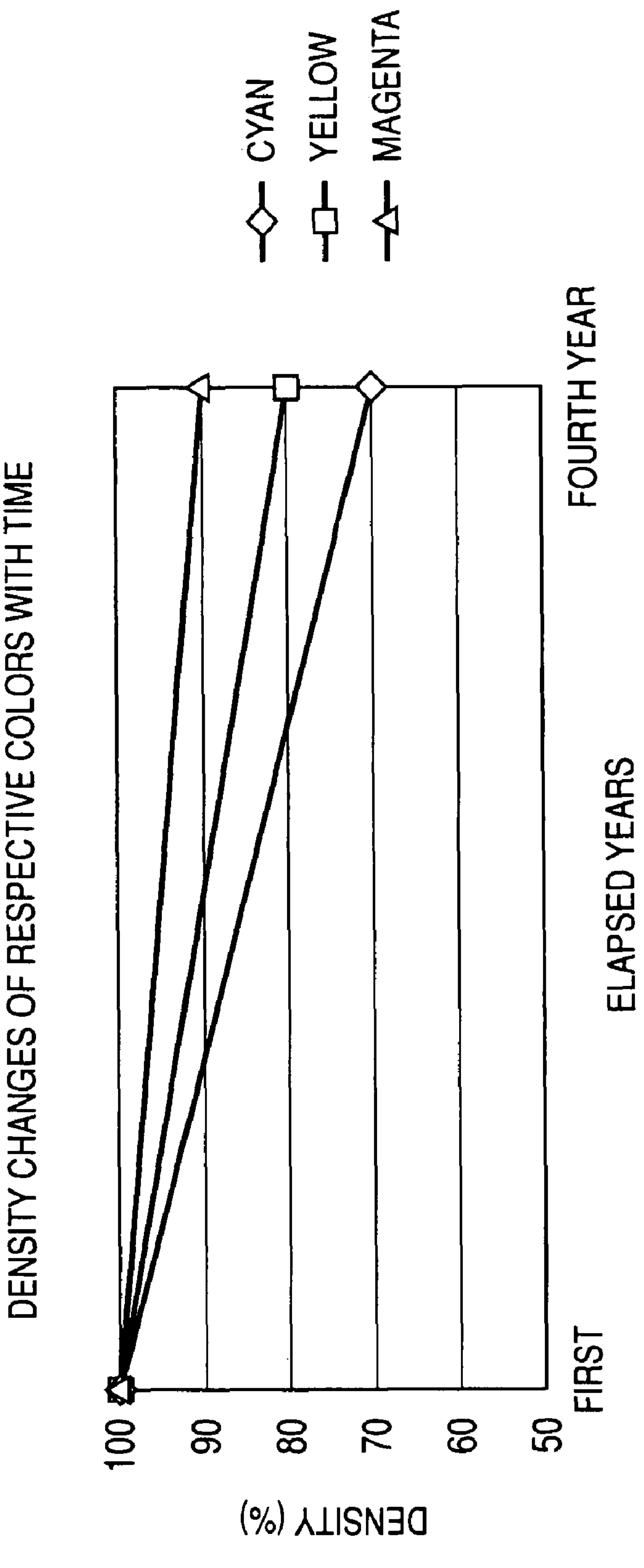
FIG. 13 is a characteristic chart showing changes of color developing characteristic of the ink ribbon with time.

If the change in color developing characteristic due to change of the ink ribbon with time contained in the ink ribbon cassette 2 is as shown in FIG. 13, for example, the density of C (cyan) with the greatest change in color developing characteristic due to change with years is 90% for 1.5 years, and thus, the period in which the color correction can be properly performed is 1.5 years from the time of manufacture.

Therefore, the main body control unit 260 at the printer main body 120 side judges whether the current date is after 1.5 years from the acquired date of manufacture information or not in the judgment processing at the step S55. If the judgment result is NO, that is, within 1.5 years, the control unit changes setting of the energization time of the thermal head 140 by the printing controller 24 so that the respective colors may be 100% in the color correction processing at the step S58.

Further, if the judgment result at the step S55 is YES, that is, the current date is after 1.5 years from the acquired date of manufacture information, since it may be impossible to perform color correction so that the respective colors may be 100%, the control unit corrects C (cyan) that has been most deteriorated to the maximum and corrects Y (yellow) and M (magenta) to the equal density ratio. Thereby, the printing result with the same hue though lower density can be obtained.

Furthermore, the lines shown in FIG. 13 are extended and the amounts of correction are estimated for correction, and thereby, the printing result with the same hue though much lower density can be obtained.

As described above, in the printer 1, since the main body control unit 260 at the printer main body 120 side acquires the date of manufacture information of the ink ribbon cassette 2 attached to the printer main body 120 as the management information, controls the printing processing based on the acquired date of manufacture information, performs color correction corresponding to the change in the color developing characteristic due to change of the ink ribbon with time, the beautiful printing results can be obtained for all time, and the life of the ink ribbon can be extended. Further, when the ink ribbon cassette 2 in which the color developing characteristic of the ink ribbon has greatly changed after many years has elapsed from the manufacture is attached, a warning is issued and pictures with changed colors can be prevented from being printed.

Figure 14A:
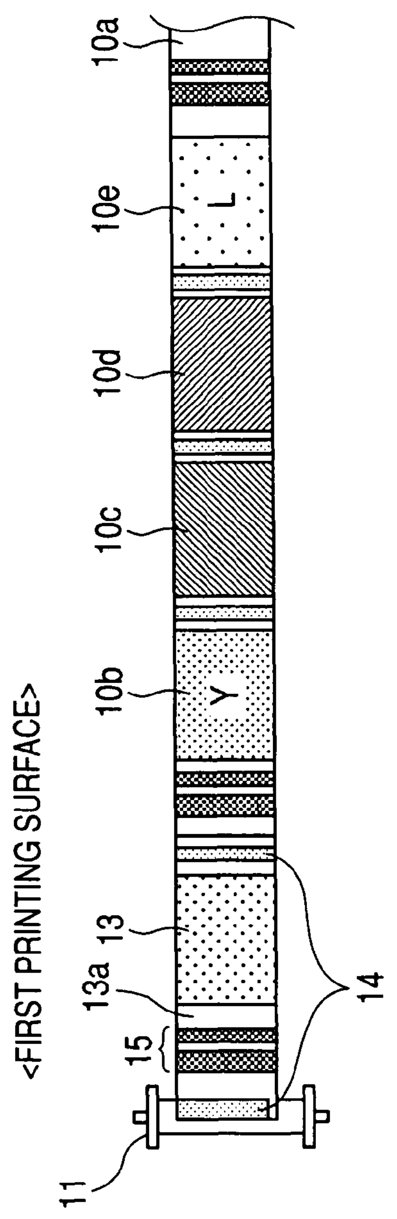
FIGS. 14A and 14B are plan views showing an ink ribbon including a cleaning part.
Figure 14B:
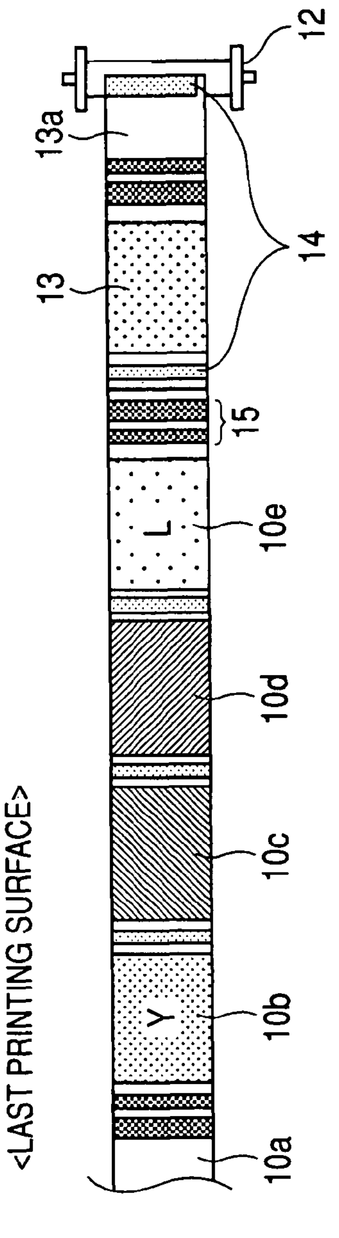

Furthermore, in the ink ribbon 10 contained in the ink ribbon cassette 2 attached to the printer main body 120 in the printer 1, as shown in FIGS. 14A and 14B, dye layers 10*b*, 10*c*, 10*d* formed of dyes of the respective colors of yellow (Y), magenta (M), cyan (C) that form images and a thermoplastic resin and protective layers 10*e* formed of the same thermoplastic resin as that of the dye layers 10*b*, 10*c*, 10*d*, for example, are sequentially and repeatedly provided at fixed intervals in the longitudinal direction on one side of a base material 10*a* made of a synthetic resin film such as a polyester film and polystyrene film. On the base material 10*a*, sets of the dye layers 10*b*, 10*c*, 10*d* and the protective layer 10*e* are sequentially formed side-by-side in the longitudinal direction. The dye layers 10*b*, 10*c*, 10*d* and the protective layers 10*e* are sequentially and thermally transferred onto the reception layer of the printing paper by being applied with thermal energy according to the image data to be printed by the thermal head 140.

Such an ink ribbon 10 is arranged to use the dye layers 10*b*, 10*c*, 10*d* of yellow (Y), magenta (M), cyan (C) and the protective layer 10*e* for printing one sheet of images. The ink ribbon 10 has one end engaged with a feed-side spool 11 and the other end wound around a take-up-side spool 12, and sequentially fed from the feed-side spool 11 and taken up by the take-up-side spool 12 with the progress of printing.

Regarding the ink ribbon 10 used in the printer 1, as long as it has at least one dye layer and one protective layer, the rest of its configuration is not specifically limited. For example, the ink ribbon 10 may be configured by a black (K) dye layer and a protective layer, or may be configured by dye layers of Y (yellow), M (magenta), c (cyan), black (K) and a protective layer.

To the ink ribbon 10 contained in the ink ribbon cassette 2 attached to the printer 1 in this embodiment, as shown in FIG. 14A or 14B, a cleaning part 13 is bonded before the first printing surface or after the last printing surface by a bonding layer 14. There is a cleaning part start mark 15 at the leading end of the cleaning part 13 and the mark is detected by a ribbon mark sensor 19, which will be described later, and thereby, the start of the cleaning part 13 can be located.

Figure 15:
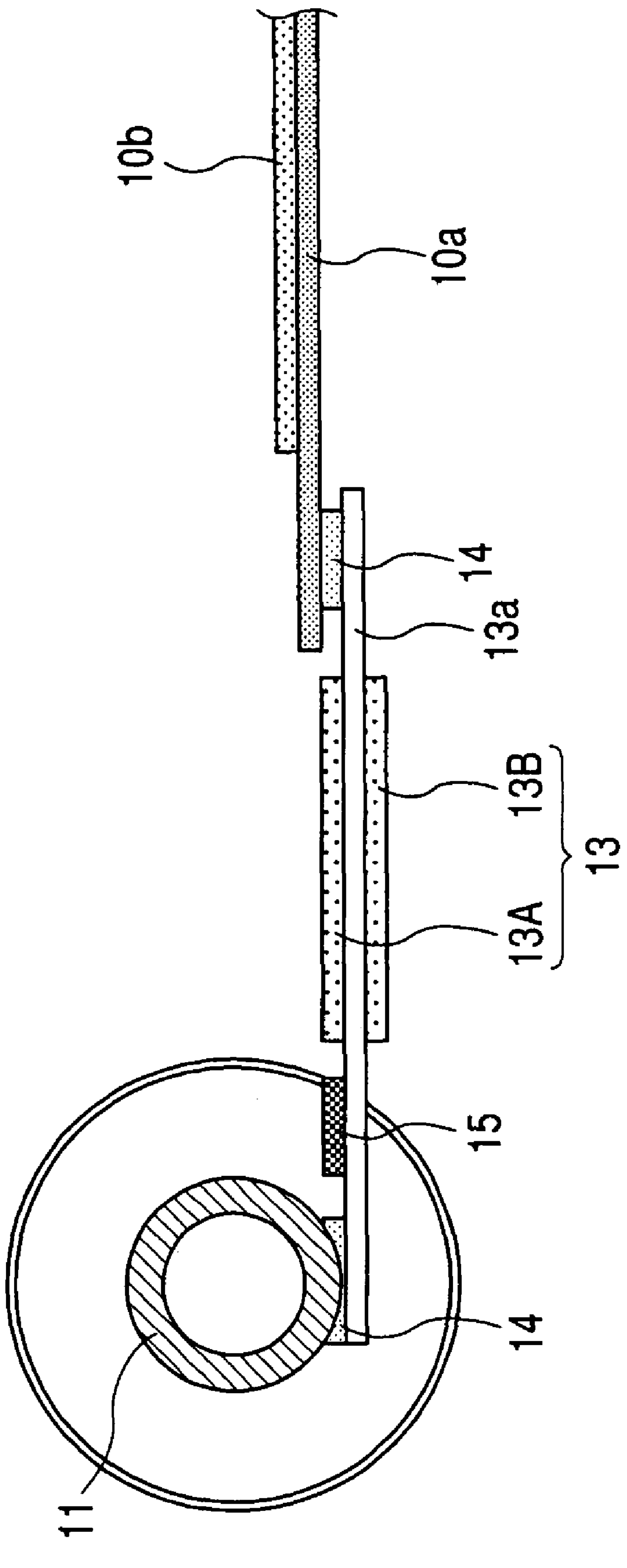
FIG. 15 is a sectional view showing a main part of the ink ribbon including the cleaning part.

As shown in FIG. 15, the cleaning part 13 has a thermal head cleaning layer 13A to which a cleaning agent suitable for cleaning the thermal head 140 is applied formed at the thermal head side, and a platen roller cleaning layer 13B to which a material for cleaning the platen roller 155 is similarly applied formed at the platen roller side with respect to the cleaning sheet base material 13*a*. In this manner, the cleaning layers 13A, 13B to both sides of which materials suitable for cleaning the respective members are applied are formed on the cleaning part 13.

When the ink ribbon cassette 2 is attached to the printer main body 120, the main body control unit 260 at the printer main body 120 side in the printer 1 acquires the printable number of sheets information of the attached ink ribbon cassette 2 and controls the cleaning processing based on the acquired printable number of sheets information.

Figure 16:
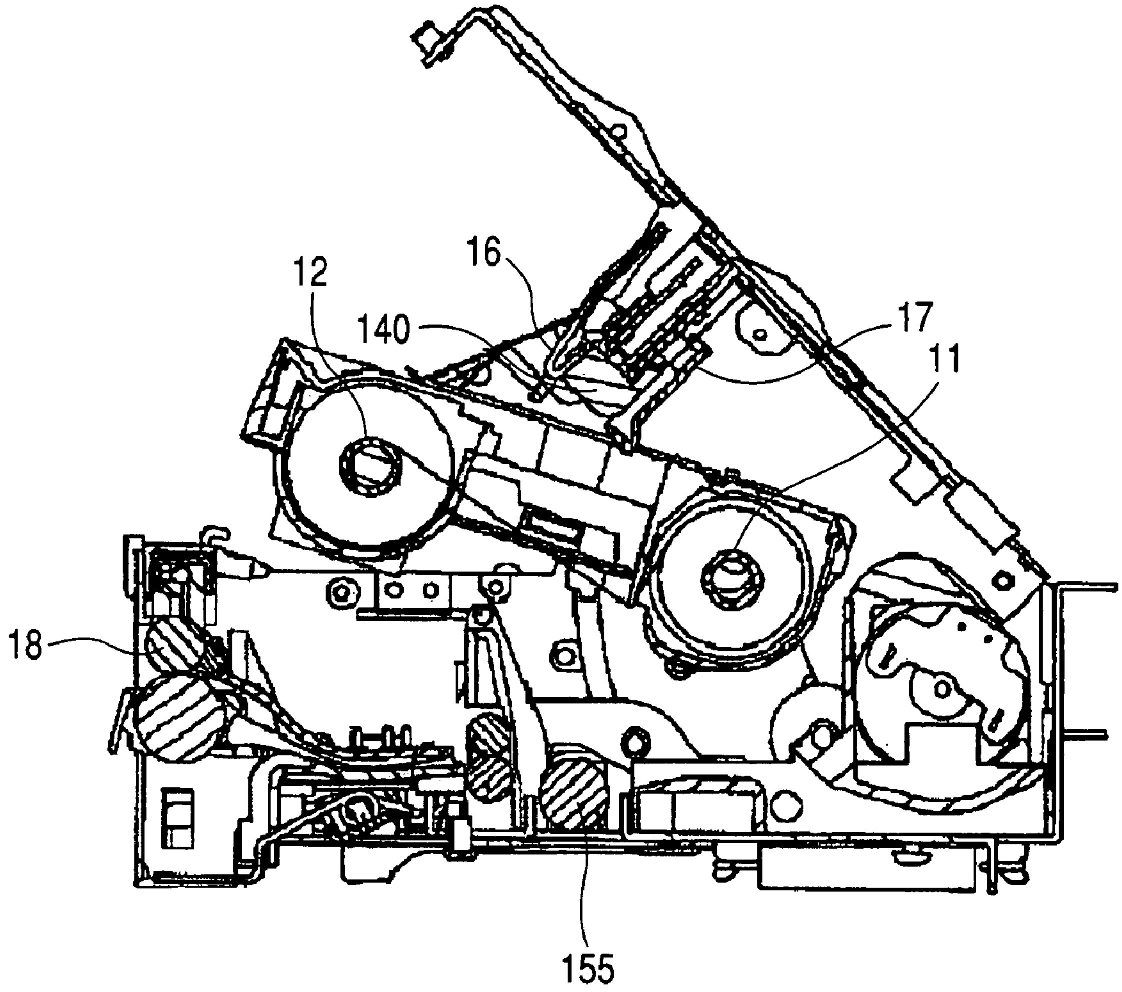
FIG. 16 is a sectional view of the printer main body of the printer when the top board is opened.

As shown in FIG. 16, a separating plate 16 and a ribbon guide 17 are integrally screwed with the thermal head 140 so that the ink ribbon head 10 may be in contact with the head part from above when the ink ribbon cassette 2 is accommodated in the mechanical deck. The ink ribbon 10 is taken up by the take-up-side spool 12 through a drive unit and fed from the feed-side spool 11.

Figure 17:
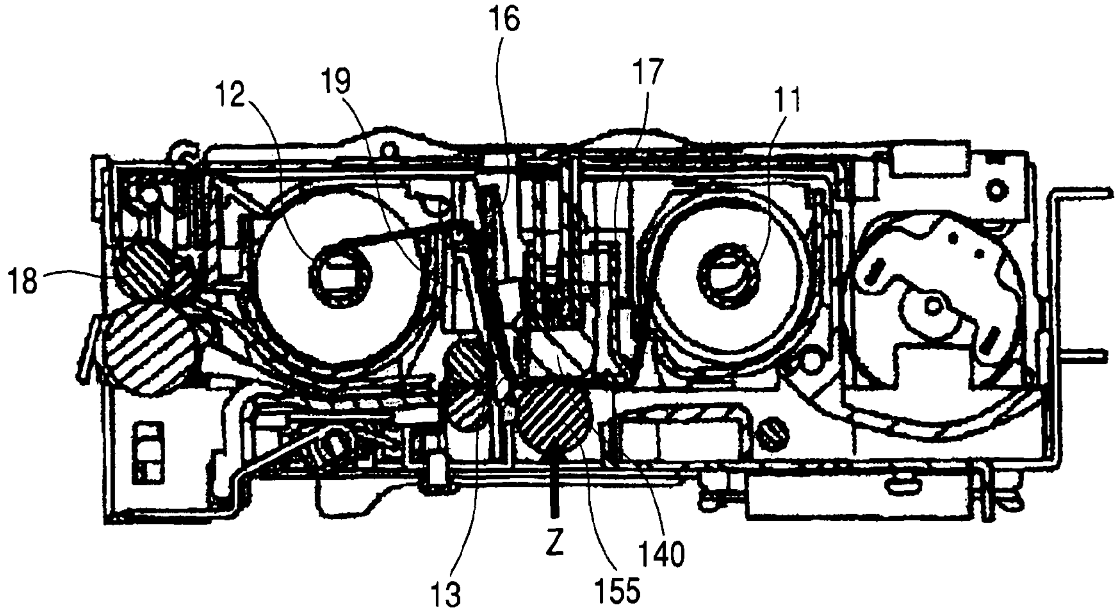
FIG. 17 is a sectional view of the printer main body of the printer when the top board is closed.

As shown in FIG. 17, after the printing operation is finished and the printing paper is ejected from a paper eject roller 18, the ink ribbon 10 is taken up to the take-up-side spool 12 side until the ribbon mark sensor detects the cleaning part start mark 15. The ribbon mark sensor 19 detects the cleaning part start mark 15, and then, the platen roller 155 that has been apart from the thermal head 140 is pressed against the head side again at predetermined pressure and the ribbon is taken up to the spool T side.

Concurrently, the thermal head cleaning layer 13A cleans the separating plate 16, the thermal head 140, and the ribbon guide 17 by rubbing their surfaces, and similarly, the platen roller cleaning layer 13B removes contaminants adhering to the plate roller 155 in contact with the platen roller 155.

Figure 18:
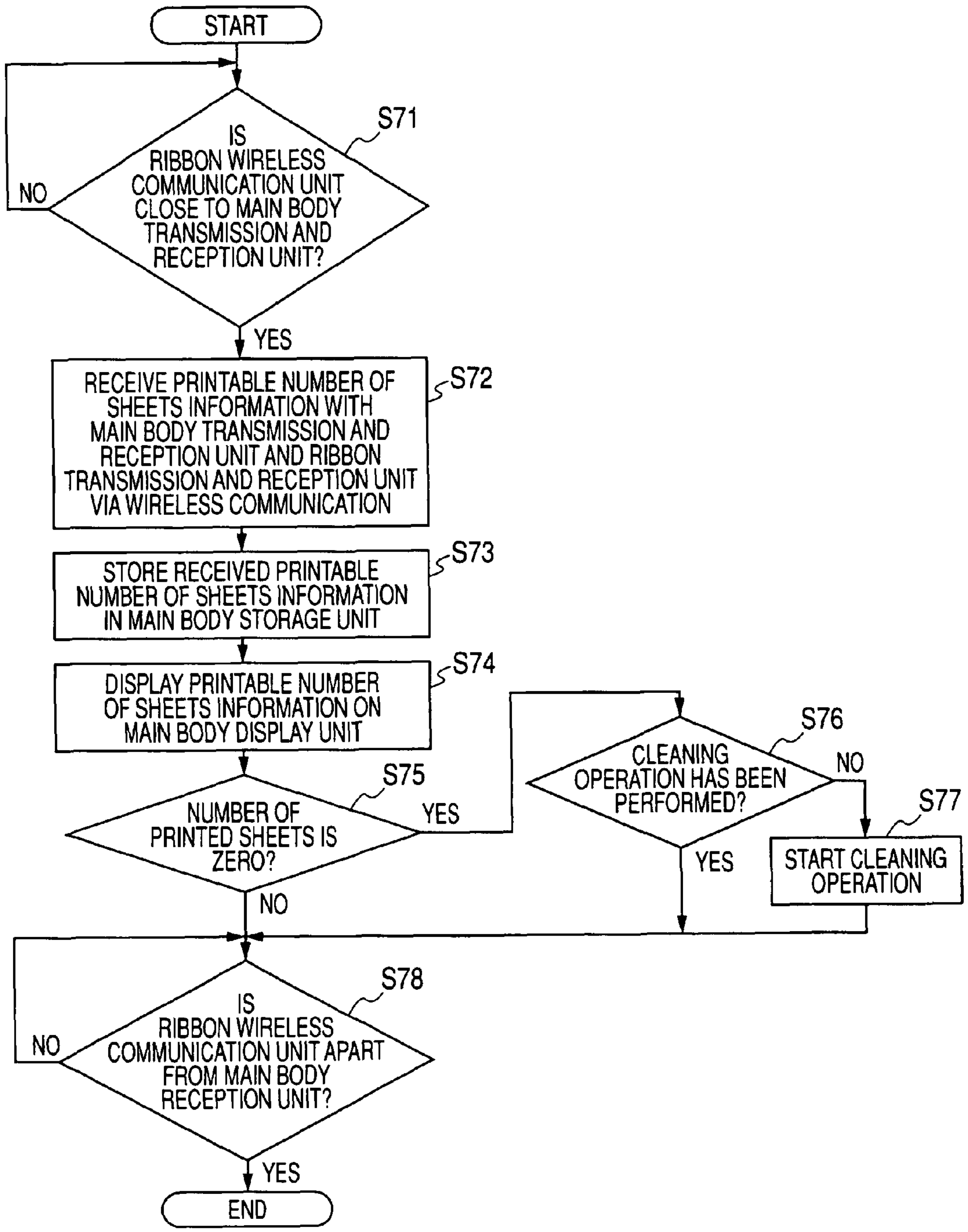
FIG. 18 is a flowchart showing a control procedure of cleaning operation when the cleaning part is before the first printing surface.

The main body control unit 260 at the printer main body 120 side in the printer 1 controls the cleaning operation according to the procedure shown in the flowchart of FIG. 18 when the cleaning part is before the first printing surface.

The main body control unit 260 at the printer main body 120 side judges whether the antenna 114 of the wireless communication unit 110 at the ink ribbon cassette 2 side is close to the antenna 201A of the wireless communication unit 200 at the printer main body 120 side (step S71). If the judgment result is YES, that is, the wireless communication unit 110 at the ink ribbon cassette 2 side is close to the wireless communication unit 200 at the printer main body 120 side, the control unit wirelessly communicates between the wireless communication unit 200 at the printer main body 120 side and the wireless communication unit 110 at the ink ribbon cassette 2 side and acquires printable number of sheets information of the ink ribbon cassette 2 (step S72), stores the acquired printable number of sheets information in the storage device 250 at the printer main body 120 side (step S73), and displays the printable number of sheets information on the main body display unit 220 (step S74).

Then, the main body control unit 260 at the printer main body 120 side judges whether the number of printed sheets is zero or not (step S75). If the judgment result is YES, that is, the number of printed sheets is zero, the control unit judges whether the cleaning operation has been performed or not (step S76), and if the judgment result is NO, that is, the cleaning operation has not been performed, the control unit performs the cleaning operation (step S77).

If the judgment result at step S75 is NO, that is, the number of printed sheets is not zero, and if the judgment result at step S76 is YES, that is, the cleaning operation has already been performed or if the judgment result at step S77 is YES, that is, the cleaning operation is finished, the control unit judges whether the wireless communication unit 110 at the ink ribbon cassette 2 side is apart from the wireless communication unit 200 at the printer main body 120 side or not (step S78), and if the judgment result is YES, that is, they are apart, the control unit ends the control operation.

Figure 19:
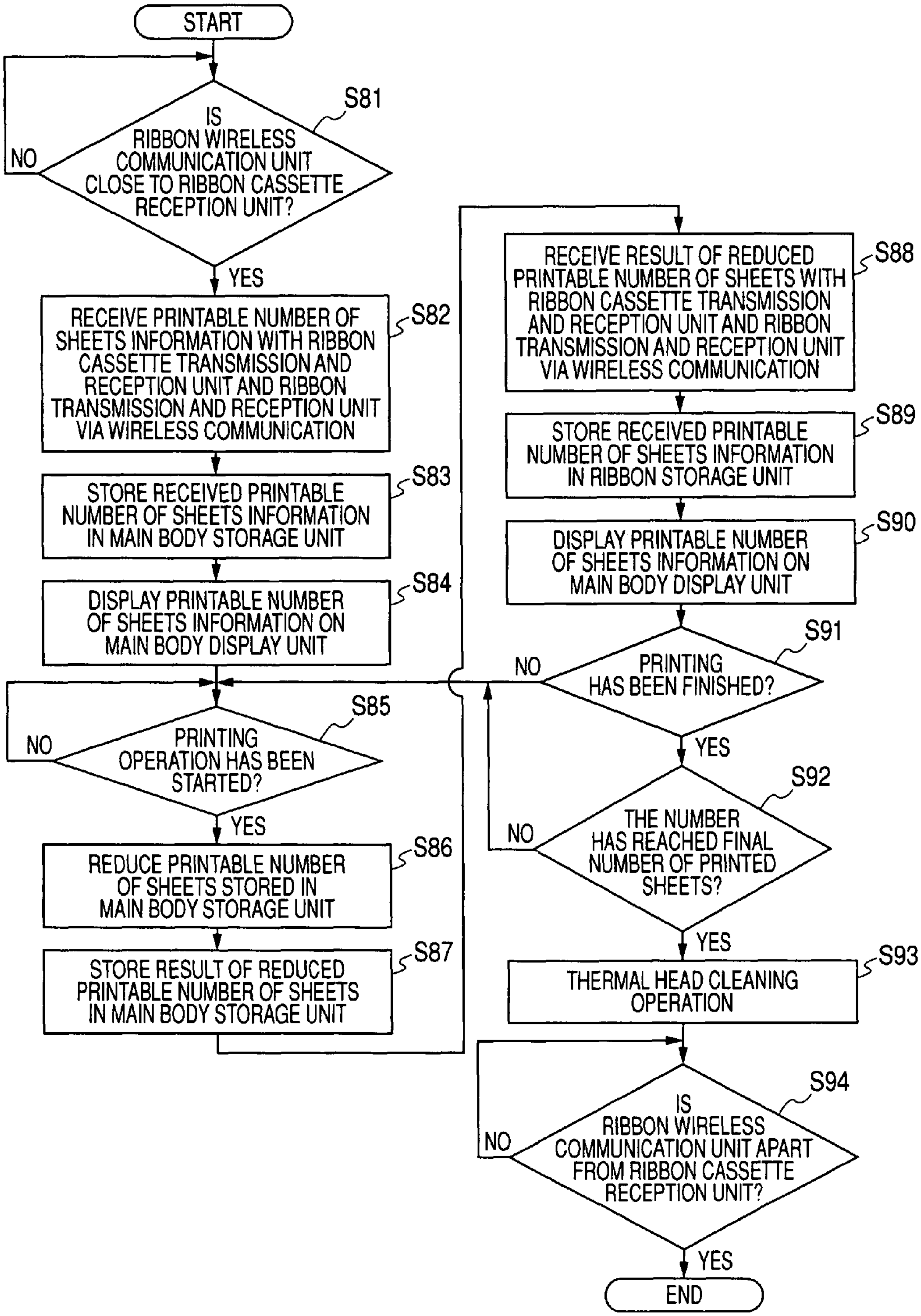
FIG. 19 is a flowchart showing a control procedure of cleaning operation when the cleaning part is at the end of the last printing surface.

Further, the main body control unit 260 at the printer main body 120 side in the printer 1 controls the cleaning operation according to the procedure shown in the flowchart of FIG. 19 when the cleaning part is at the end of the last printing surface.

The main body control unit 260 at the printer main body 120 side judges whether the antenna 114 of the wireless communication unit 110 at the ink ribbon cassette 2 side is close to the antenna 201A of the wireless communication unit 200 at the printer main body 120 side (step S81). If the judgment result is YES, that is, the wireless communication unit 110 at the ink ribbon cassette 2 side is close to the wireless communication unit 200 at the printer main body 120 side, the control unit wirelessly communicates between the wireless communication unit 200 at the printer main body 120 side and the wireless communication unit 110 at the ink ribbon cassette 2 side and acquires printable number of sheets information of the ink ribbon cassette 2 (step S82), stores the acquired printable number of sheets information as printing information α in the storage device 250 at the printer main body 120 side (step S83), and displays the printable number of sheets information on the main body display unit 220 (step S84).

Then, the main body control unit 260 at the printer main body 120 side judges whether the printing operation has been started or not (step S85). If the judgment result is YES, that is, the printing operation is started, the control unit reduces the printable number of sheets information stored in the storage device 250 at the printer main body 120 side (step S86), and stores the reduced printable number of sheets information in the storage device 250 at the printer main body 120 side (step S87).

Next, the control unit wirelessly communicates between the wireless communication unit 200 at the printer main body 120 side and the wireless communication unit 110 at the ink ribbon cassette 2 side and transmits the reduced printable number of sheets information to the wireless communication unit 110 at the ink ribbon cassette 2 side, and the wireless communication unit 110 at the ink ribbon cassette 2 side receives the reduced printable number of sheets information (step S88) and stores the received printable number of sheets information in the storage device 111 at the ink ribbon cassette 2 side (step S89).

Then, the main body control unit 260 at the printer main body 120 side displays the printable number of sheets information on the main body display unit 220 (step S90) and judges whether the printing operation has been finished or not (step S91). If the judgment result is NO, that is, the printing operation has not been finished, the control unit returns to the above described step S85 and judges whether the next printing operation has been started or not. If the judgment result at step S90 is YES, that is, the printing operation has been finished, the control unit judges whether the number has reached the final number of printed sheets (step S92). If the judgment result is NO, that is, the number has not reached the final number of printed sheets, the control unit returns to the above described step S85, and if the judgment result at step S92 is YES, that is, the number has reached the final number of printed sheets, the control unit performs the cleaning operation of the thermal head (step S93). Then, the control unit judges whether the wireless communication unit 110 at the ink ribbon cassette 2 side is apart from the wireless communication unit 200 at the printer main body 120 side or not (step S94), and if the judgment result is YES, that is, they are apart, the control unit ends the control operation.

In this manner, in the printer 1, when the ink ribbon cassette 2 is attached to the printer main body 120, the cleaning operation can be regularly and automatically performed using the management information read from the attached ink ribbon cassette 2 not only for the ink ribbon cassette 2 at the beginning of use but also even for the ink ribbon cassette 2 during use. Thereby, the user can unconsciously perform the cleaning operation without using a separately prepared cleaning cassette, and the printing defects due to printing streaks generated when contaminants adhere to the thermal head or the like can be prevented and the maintenance free of the printer main body can be realized. Further, since the cleaning part and the printing surface part are bonded, the ink ribbon cassette 2 can be manufactured with more inexpensive manufacturing facilities. Furthermore, since the cleaning agents are appropriately applied to both sides of the cleaning part base material, not only the cleaning for the thermal head side but also the cleaning for the platen roller can be performed at the same time.

It should be understood by those skilled in the art that various modifications, combinations, sub-combinations and alterations may occur depending on design requirements and other factors insofar as they are within the scope of the appended claims or the equivalents thereof.

What is claimed is:

1. A thermal dye sublimation printer to which an ink ribbon cassette having a function of transmitting and receiving data via wireless communication, the ink ribbon cassette being either operably connected to the thermal dye sublimation printer or disconnected therefrom but located in close proximity thereto, the thermal dye sublimation printer comprising:

communication means that transmits and receives data via wireless communication with the ink ribbon cassette, the communication means including a first antenna and a second antenna; and control means that acquires management information of the ink ribbon cassette stored in the ink ribbon cassette side via the communication means, stores the acquired management information in a printer storage unit, controls printing processing based on the acquired management information, causes a printing operation, updates at least a portion of the management information to form updated management information after causing the printing operation, storing the updated management information in the printer storage unit and transmitting the updated management information to the ink ribbon cassette, wherein the communication means receives and transmits the data via the first antenna when the ink ribbon cassette is operably connected to the thermal dye sublimation printer and the communication means receives and transmits the data via the second antenna when the ink ribbon cassette is disconnected from the thermal dye sublimation printer yet is located in close proximity thereto and wherein the control means acquires printable number of sheets information of the ink ribbon cassette operably connected or disconnected therefrom yet in close proximity to the thermal dye sublimation printer when the ink ribbon cassette having a cleaning part before a first printing surface or after a last printing surface of the ink ribbon is operably connected or disconnected therefrom yet in close proximity to the thermal dye sublimation printer and controls cleaning processing based on the acquired printable number of sheets information.

2. The thermal dye sublimation printer according to claim 1, wherein the control means acquires unique color information an ink ribbon contained in the ink ribbon cassette operably connected or disconnected therefrom yet in close proximity to the thermal dye sublimation printer as the management information via the communication means, controls the printing processing based on the acquired color information, and thereby, performs color correction corresponding to a unique color developing characteristic of the ink ribbon cassette operably connected or disconnected therefrom yet in close proximity to the thermal dye sublimation printer.

3. The thermal dye sublimation printer according to claim 1, wherein the control means acquires print history information of the ink ribbon cassette operably connected or disconnected therefrom yet in close proximity to the thermal dye sublimation printer as the management information and controls the printing processing based on the acquired print history information.

4. The thermal dye sublimation printer according to claim 1, wherein the control means acquires type information of the ink ribbon cassette operably connected or disconnected therefrom yet in close proximity to the thermal dye sublimation printer as the management information when the ink ribbon cassette is properly operably connected or disconnected therefrom yet in close proximity to the thermal dye sublimation printer and recognizes the type of the ink ribbon cassette and the presence or absence of the ink ribbon cassette at the same time.

5. The thermal dye sublimation printer according to claim 1, wherein the control means acquires date of manufacture information of the ink ribbon cassette operably connected or disconnected therefrom yet in close proximity to the thermal dye sublimation printer as the management information, controls the printing processing based on the acquired date of manufacture information, and performs color correction corresponding to the change in color developing characteristic due to change of the ink ribbon with time.

6. The thermal dye sublimation printer according to claim 5, wherein the control means issues a warning that the printing result may contain color deterioration when the color correction of the ink ribbon cassette operably connected or disconnected therefrom yet in close proximity to the thermal dye sublimation printer is insufficient based on the acquired date of manufacture information.

7. An ink ribbon cassette adapted to be either operably connected to a thermal dye sublimation printer or disconnected therefrom but located in close proximity thereto, the thermal dye sublimation printer having a function of transmitting and receiving data via wireless communication through either a first antenna or a second antenna, the ink ribbon cassette comprising:

communication means that transmits and receives data between the thermal dye sublimation printer and itself;

storage means that stores management information of the ink ribbon cassette; and a cleaning part before a first printing surface or after a last printing surface of an ink ribbon, wherein the management information stored in the storage means is transmitted to the thermal dye sublimation printer via the communication means for the thermal dye sublimation printer to conduct a printing operation based upon the transmitted management information and, after the printing operation is conducted by the thermal dye sublimation printer, at least a portion of the management information is updated to form updated management information so that the communication means receives the updated management information for storage in the storage means, wherein the communication means receives and transmits the data via the first antenna when the ink ribbon cassette is operably connected to the thermal dye sublimation printer and the communication means receives and transmits the data via the second antenna when the ink ribbon cassette is disconnected from the thermal dye sublimation printer yet is located in close proximity thereto, and wherein printable number of sheets information as the management information stored in the storage means is transmitted to the thermal dye sublimation printer via the communication means and the printable number of sheet information in the storage means is updated by the thermal dye sublimation printer via the communication means.

8. The ink ribbon cassette according to claim 7, wherein at least date of manufacture information is stored in the storage means as the management information.

9. A thermal dye sublimation printer to which an ink ribbon cassette having a function of transmitting and receiving data via wireless communication with a thermal dye sublimation printer is operably connected or disconnected therefrom yet in close proximity thereto, the thermal dye sublimation printer comprising:

a communication unit that transmits and receives data via wireless communication with an ink ribbon cassette, the communication unit including a first antenna and a second antenna; and a control unit that acquires management information of the ink ribbon cassette stored in the ink ribbon cassette side via the communication unit, stores the acquired management information in a printer storage unit, controls printing processing based on the acquired management information, causes a printing operation, updates at least a portion of the management information to form updated management information after causing the printing operation, stores the updated management information in the printer storage unit and transmits the updated management information to the ink ribbon cassette, wherein the communication unit receives and transmits the data via the first antenna when the ink ribbon cassette is operably connected to the thermal dye sublimation printer and the communication unit receives and transmits the data via the second antenna when the ink ribbon cassette is disconnected from the thermal dye sublimation printer yet is located in close proximity thereto and wherein the control unit acquires printable number of sheets information of the ink ribbon cassette operably connected or disconnected therefrom yet in close proximity to the thermal dye sublimation printer when the ink ribbon cassette having a cleaning part before a first printing surface or after a last printing surface of the ink ribbon is operably connected or disconnected therefrom yet in close proximity to the thermal dye sublimation printer and controls cleaning processing based on the acquired printable number of sheets information.

10. An ink ribbon cassette adapted to be operably connected to a thermal dye sublimation printer or disconnected therefrom but located in close proximity thereto, the thermal dye sublimation printer having a function of transmitting and receiving data via wireless communication through either a first antenna or a second antenna, the ink ribbon cassette comprising:

a communication unit that transmits and receives data between a thermal dye sublimation printer and itself;

a storage unit that stores management information of the ink ribbon cassette; and a cleaning part before a first printing surface or after a last printing surface of an ink ribbon, wherein the management information stored in the storage unit is transmitted to the thermal dye sublimation printer via the communication unit for conducting a printing operation based upon the transmitted management information and, after the printing operation is conducted, at least a portion of the management information is updated to form updated management information so that the communication unit receives the updated management information for storage in storage unit, wherein the communication unit receives and transmits the data via the first antenna when the ink ribbon cassette is operably connected to the thermal dye sublimation printer and the communication unit receives and transmits the data via the second antenna when the ink ribbon cassette is disconnected from the thermal dye sublimation printer yet is located in close proximity thereto, and wherein printable number of sheets information as the management information stored in the storage unit is transmitted to the thermal dye sublimation printer via the communication unit and the printable number of sheet information in the storage means is updated by the thermal dye sublimation printer via the communication unit.

* * * * *